United States Patent [19]

Valle et al.

[11] Patent Number: 5,667,744

[45] Date of Patent: Sep. 16, 1997

[54] METHOD FOR FABRICATING COLUMNS

[75] Inventors: Jorge Del Valle, Lawrenceville; Fred L. Hicks, Mableton; Steven W. Spires; Daniel J. Brown, both of Atlanta, all of Ga.

[73] Assignee: Focal Point Products, Inc., Atlanta, Ga.

[21] Appl. No.: 443,889

[22] Filed: May 31, 1995

Related U.S. Application Data

[63] Continuation of Ser. No. 285,045, Aug. 3, 1994, abandoned, which is a continuation of Ser. No. 994,684, Dec. 22, 1992, abandoned.

[51] Int. Cl.[6] .................. B28B 1/20; B28B 7/36; B28B 7/38; B28B 13/06
[52] U.S. Cl. .......... 264/225; 264/310; 264/311; 264/313; 264/334; 264/338
[58] Field of Search .................. 264/334, 338, 264/313, 311, 40.1, 225, 226, 227, 310; 425/150; 249/112

[56] References Cited

U.S. PATENT DOCUMENTS

| 1,262,868 | 4/1918 | Tamm | 264/311 |
|---|---|---|---|
| 1,299,842 | 4/1919 | Landwehr | 264/311 |
| 1,480,740 | 1/1924 | Barkschat | 264/311 X |
| 1,857,233 | 5/1932 | Bertandeau | 249/112 |
| 1,955,760 | 4/1934 | Nichols | 264/338 X |
| 2,440,754 | 5/1948 | Nagel | 264/311 |
| 2,779,058 | 1/1957 | Hyde | 18/27 |
| 2,937,421 | 5/1960 | Taccone | 264/313 X |
| 3,127,910 | 4/1964 | Scott . | |
| 3,150,219 | 9/1964 | Schmidt | 264/311 |
| 3,290,426 | 12/1966 | Barrentine | 264/311 |
| 3,383,742 | 5/1968 | Nelson | 264/334 X |
| 3,428,725 | 2/1969 | Delmonte Glendale | 264/226 |
| 3,641,228 | 2/1972 | Fleck | 264/225 X |
| 3,709,754 | 1/1973 | Medler . | |
| 3,776,683 | 12/1973 | Putzer et al. | 425/440 |
| 3,813,837 | 6/1974 | McClain et al. . | |
| 3,870,775 | 3/1975 | Castro et al. | 264/311 X |
| 3,883,627 | 5/1975 | Fitts | 269/112 X |
| 3,896,858 | 7/1975 | Whatley . | |
| 3,982,725 | 9/1976 | Maurino et al. | 249/139 |
| 4,088,808 | 5/1978 | Cornwell et al. | 264/311 X |
| 4,097,572 | 6/1978 | Walker | 264/313 X |
| 4,206,899 | 6/1980 | Whitehead | 249/139 |
| 4,289,172 | 9/1981 | Ekström . | |
| 4,289,724 | 9/1981 | Baynard | 264/225 |
| 4,600,373 | 7/1986 | Swanson | 264/311 X |
| 4,798,364 | 1/1989 | Scott | 264/225 X |
| 4,858,891 | 8/1989 | Boes | 256/19 |
| 4,898,702 | 2/1990 | Elkins et al. | 264/334 X |
| 5,110,526 | 5/1992 | Hayashi et al. | 264/334 X |
| 5,169,585 | 12/1992 | Le Goureirec | 264/338 X |

FOREIGN PATENT DOCUMENTS

| 2921652 | 12/1980 | Germany | 244/311 |
|---|---|---|---|

OTHER PUBLICATIONS

FIG. 1–Perspective View of Prior Art Spin Cast Molding App.
FIG. 2–Perspective Cut-Away View of the Prior Art Spin Cast Molding App. of FIG. 1 in a Seperated Configuration.

*Primary Examiner*—Karen Aftergut
*Attorney, Agent, or Firm*—Louis T. Isaf

[57] ABSTRACT

A method and apparatus for fabricating columns, wherein the apparatus includes a column fabricating assembly and a column extractor. The column fabricating assembly includes a unitary column mold and a mold support assembly. The unitary column mold is reusable and is fabricated specially for the task of fabricating a column therein. Uncured column materials are placed into the unitary column mold and the unitary column mold is enclosed in the mold support assembly. The uncured column materials cure, and thus the column is formed, while the unitary column mold is encased in and spun by the mold support assembly. The unitary column mold is removed from the mold support assembly with the column therein. The column extractor is used to extract the column from the unitary column mold; the unitary column mold is secured by the column extractor and the column extractor pulls the column out of the unitary column mold.

25 Claims, 10 Drawing Sheets

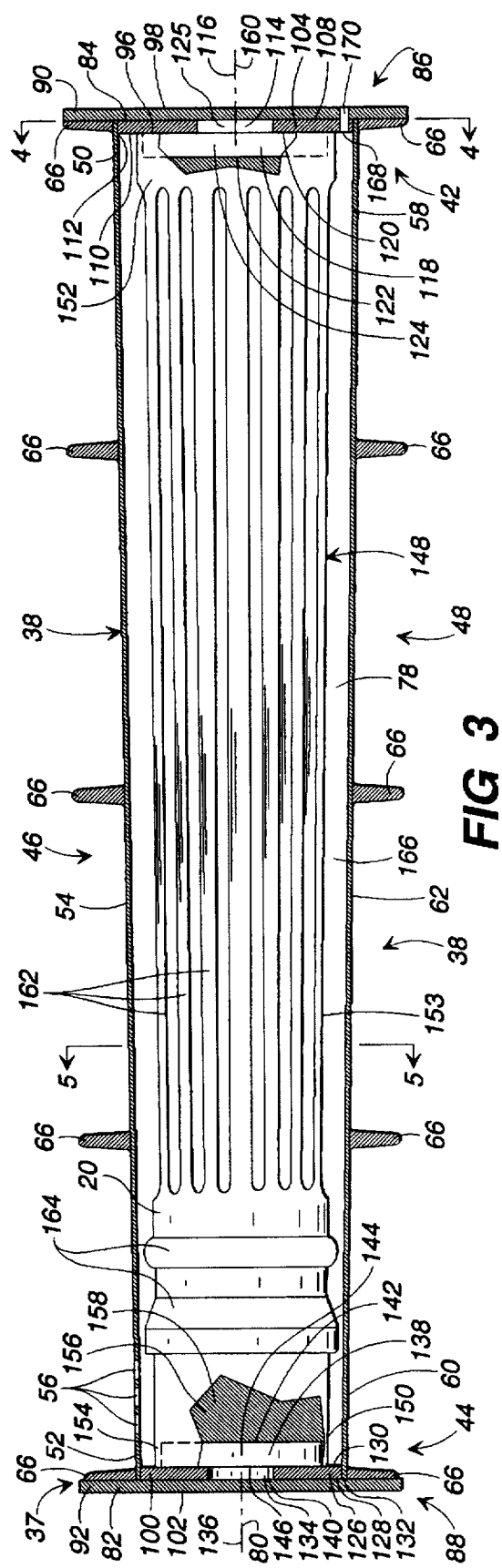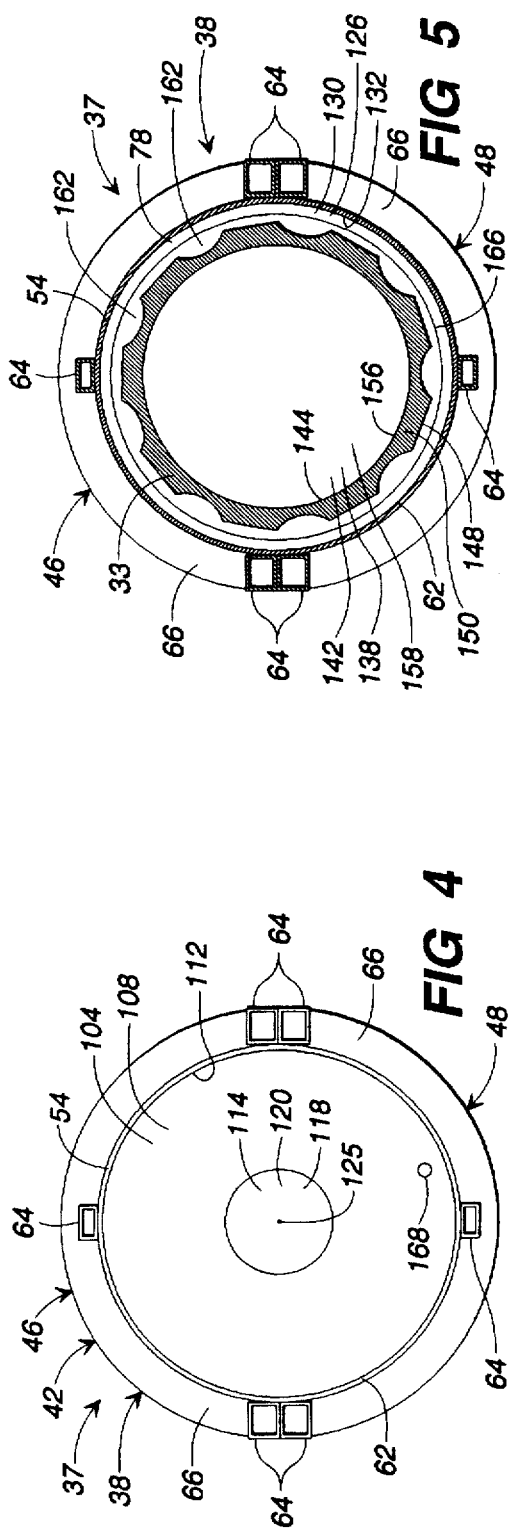

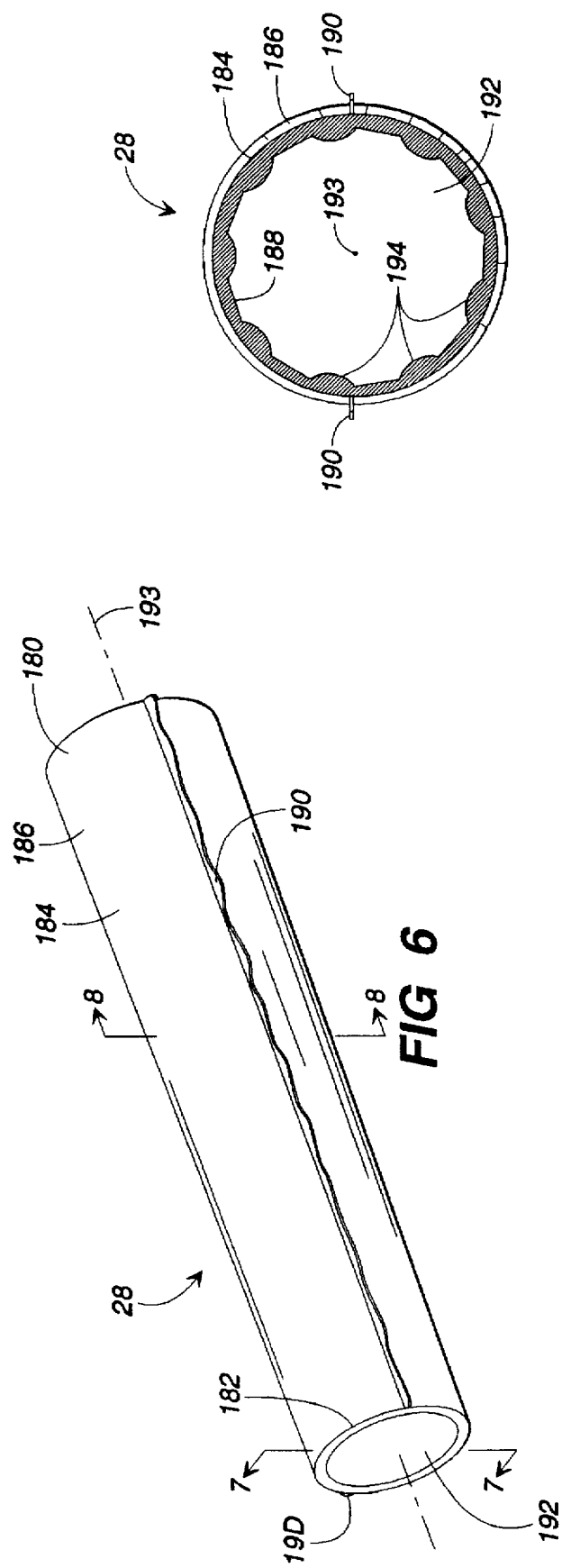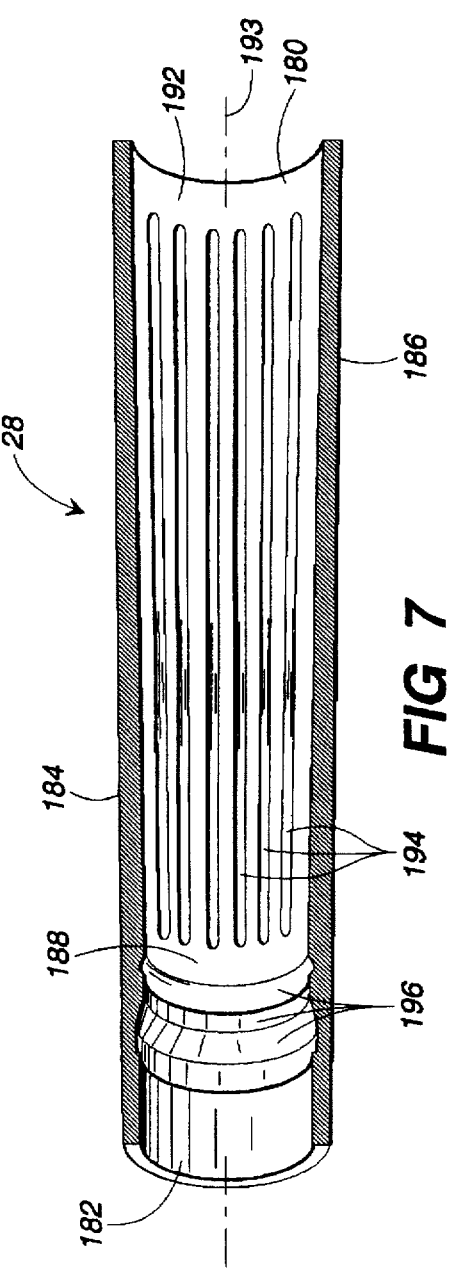

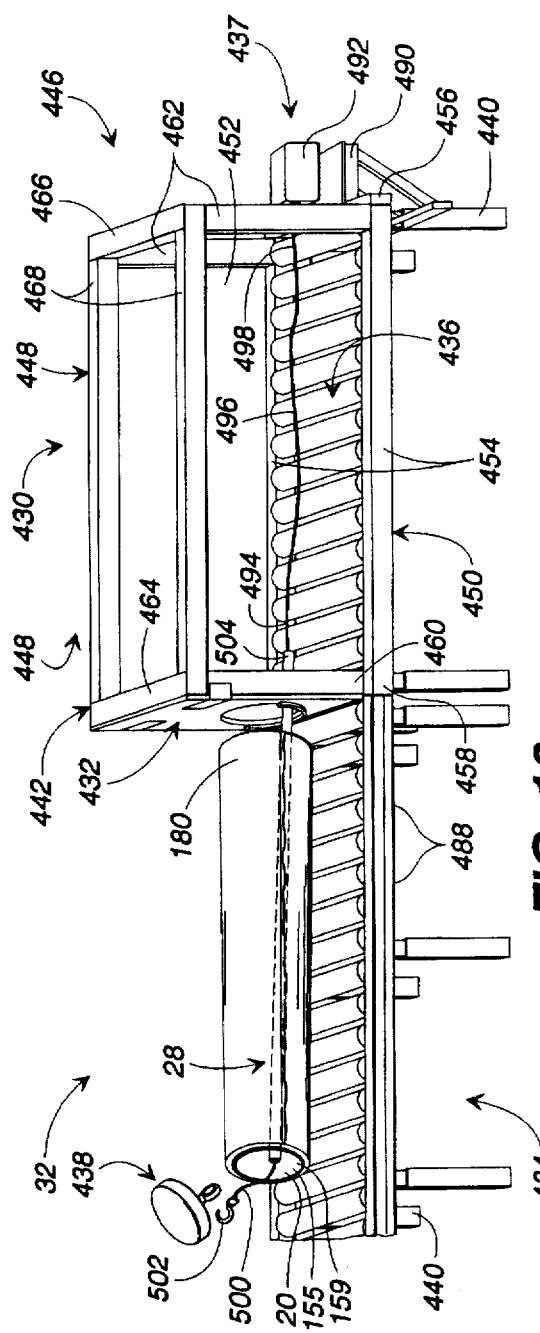
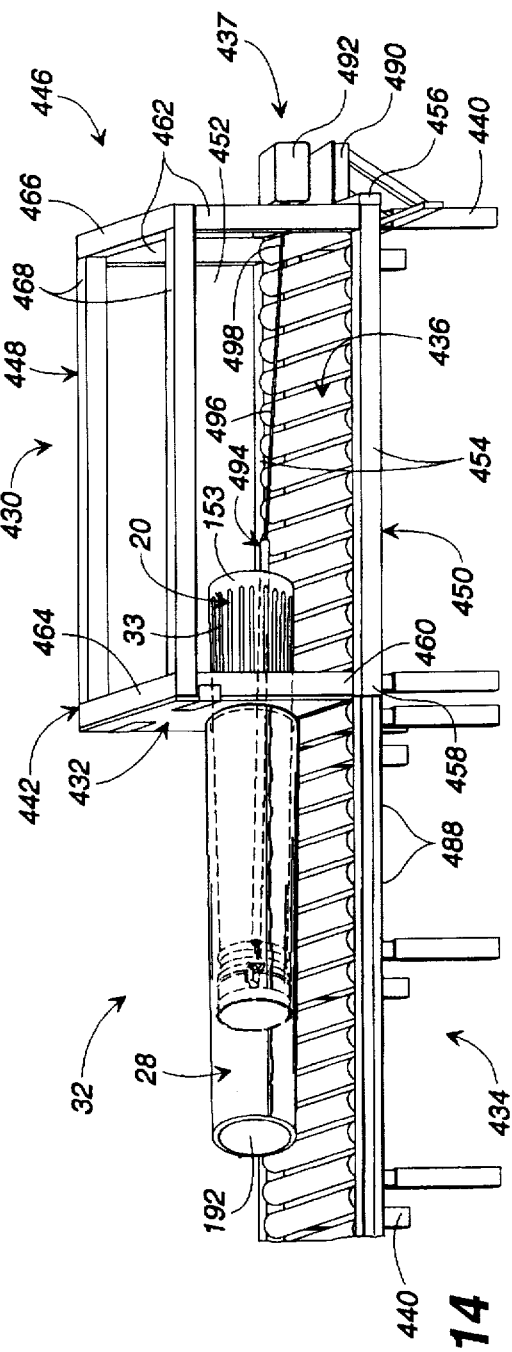
FIG. 13
FIG. 14

METHOD FOR FABRICATING COLUMNS

This application is a continuation of application Ser. No. 08/285,045, filed on Aug. 3, 1994, now abandoned, which is a continuation of application Ser. No. 07/994,684, filed on Dec. 22, 1992, and now abandoned.

FIELD OF THE INVENTION

The present invention relates generally to the field of fabrication, and, in its most preferred embodiments, to the field of fabricating fiberglass columns by spin-cast molding.

BACKGROUND OF THE INVENTION

A column is an important architectural structure that serves both as a vertical support member and as ornamentation. Historically, columns have been constructed of wood, stone, concrete, steel and the like. More recently, however, fiberglass has emerged as a favored material for column construction.

A cast fiberglass column is typically fabricated from a column mold. First, uncured fiberglass material is deposited into the column mold. Second, the fiberglass is formed and cured within the mold to form a column. Third, the column is removed from the mold. The exterior features of the column are typically formed by the contour of the interior walls of the mold. Typically the mold is a rigid, two piece mold, wherein each piece of the mold extends the length of the column and forms the surface of half of the column. The junctures of the two mold portions typically cause imperfections or flaws along the length of the column. Typically the imperfections are parting-lines which are formations of fiberglass that protrude radially from the surface of the fiberglass column. Parting-lines are formed when uncured fiberglass conforms to the junctures of the mold portions and cures. In order to appreciate the full ornamental value of the column, parting-line imperfections must be remedied. Parting-lines are typically removed by machining after the column has been formed and removed from the mold. Such machining typically includes grinding and sanding the parting-line until it is removed and the column surface is smooth. Unfortunately, machining cured fiberglass is relatively difficult and time consuming.

Additional problems accompany the fabrication of fluted columns, those having parallel grooves along their length, or columns with vines, leaves, flowers and other ornamental features defined by undercuts or relief. If a conventional smooth mold were modified to include protrusions/intrusions to form column grooves and ornaments, once the fiberglass cures within the mold, the column would "lock" the mold together or cause damage during removal because of the interference between the undercuts on the column surface and the protrusions along the mold inner wall. As a consequence, fluted and ornamented columns are typically constructed from nonfluted columns by machining the flutes and other ornamental features into the smooth surface of the nonfluted columns. As specified above, cured fiberglass is relatively difficult and time consuming to machine. Thus, the creation of fluted and ornate columns is often very resource intensive and cost prohibitive.

There is a need therefore, for an improved method and apparatus for fabricating fiberglass columns addressing these and other related, and unrelated, problems.

SUMMARY OF THE INVENTION

Briefly described, the present invention includes an improved method and apparatus for fabricating hollow fiberglass columns. A unitary column mold is central to the most preferred embodiment of the present invention. The unitary and flexible nature of the unitary column mold allows ornamented, fluted and nonfluted fiberglass columns to be fabricated without parting lines and without requiring machining.

In the preferred embodiment of the present invention, the unitary column mold is fabricated from a shell and a master. The shell includes a shell wall that defines an accessible shell cavity and the master is a column which is to be duplicated. The unitary column mold is fabricated by placing the master in the shell cavity to define a mold void between the master and the shell wall. The mold void is then filled with uncured mold material, and the uncured mold material is cured to form a unitary column mold around the master. The unitary column mold is then removed from the shell cavity and the master is extracted from the unitary column mold. In the preferred embodiment of the present invention, the master is extracted from the unitary column mold in the same manner a column is extracted from the unitary column mold, as is discussed below.

In the preferred embodiment of the present invention, a fiberglass column is fabricated from the unitary column mold and uncured column material. The unitary column mold includes a mold wall defining a mold cavity through the unitary column mold. The mold wall is contoured to define the exterior features of a fabricated column. The unitary column mold further includes a first end opening and a second end opening and the mold cavity extends longitudinally therebetween. The fiberglass column is formed by depositing uncured column material, according to a new formulation, into the unitary column mold and then curing the uncured column material. The unitary column mold is housed in a mold support assembly and is rotated about a longitudinal centerline defined through the mold cavity. The rotation causes the uncured column material to spread about the mold wall. The uncured column material is allowed to cure while it is spread about the mold wall and, as a result, a column is formed within the unitary column mold.

Once the column has formed, the unitary column mold, with the column therein, is removed from the mold support assembly. The column is extracted from the unitary column mold by securing the unitary column mold and pulling the column through the mold cavity and out one of the ends of the unitary column mold. In the preferred embodiment of the present invention, the unitary column mold is compliant and thus the column surface is not restricted within or snagged by the unitary column mold during the extraction process.

In the preferred embodiment of the present invention, the column is extracted from the unitary column by an extractor assembly. The extractor assembly includes a panel defining an extraction opening therethrough. The extraction opening is sized to allow the column to pass therethrough while preventing the unitary column mold from passing therethrough. An end of the unitary column mold is aligned with the extraction opening and the column is pulled through the extraction opening and out of the mold cavity.

In the preferred embodiment of the present invention, the column fabrication process is essentially complete once the column is extracted from the unitary column mold. No machining of the column, either to form ornamental features or to remove unwanted parting lines, is necessary. The wall of the unitary column mold is contoured and forms all of the desired ornamental features on the column surface, and the unitary nature of the unitary column mold precludes the formation of any parting lines on the column surface.

It is, therefore, an object of the present invention to provide an improved method and apparatus of fabrication.

Another object of the present invention is to provide a new fiberglass formulation and method of molding.

Another object of the present invention is to provide a method and apparatus for fabricating a unitary column mold.

Another object of the present invention is to provide a method and apparatus for fabricating a column.

Another object of the present invention to provide an improved method and apparatus for extracting a column from a mold.

Another object of the present invention is to provide an apparatus and method for fabricating fiberglass columns that minimizes machining requirements.

Yet another object of the present invention is to provide a method and apparatus for fabricating fiberglass columns that precludes the formation of parting lines.

Still another object of the present invention is to provide a method and apparatus for fabricating fluted and ornamented fiberglass columns wherein the fluting and other ornaments are formed during molding.

Still another object of the present invention is to provide a unitary column mold.

Still another object of the present invention is to provide a method and apparatus for removing a fabricated column from a unitary column mold.

BRIEF DESCRIPTION OF THE DRAWINGS

FIG. 3 is a cross-sectional cut-away view of the mold fabricating apparatus of FIG. 2 taken along line 3—3 of FIG. 2.

FIG. 4 is a cross-sectional cut-away view of the mold fabricating apparatus of FIG. 2 taken along line 4—4 of FIG. 3.

FIG. 5 is a cross-sectional cut-away view of the mold fabricating apparatus of FIG. 2 taken along line 5—5 of FIG. 3.

FIG. 6 is a perspective view of the unitary column mold in accordance with the preferred embodiment of the present invention.

FIG. 7 is a perspective cross-sectional view of the unitary column mold of FIG. 6 taken along line 7—7 of FIG. 6.

FIG. 8 is a cross-sectional view of the unitary column mold of FIG. 6 taken along line 8—8 of FIG. 6.

FIG. 13 is a perspective view of a column extractor in accordance with the preferred embodiment of the present invention, with a unitary column mold and encased column thereon.

FIG. 14 is a perspective view of the column extractor of FIG. 13 with a column being extracted from the unitary column mold thereon.

DETAILED DESCRIPTION OF THE PREFERRED EMBODIMENT

In this portion of the specification, the drawings are referred to in greater detail, and like numerals represent like components throughout the several views. This portion of the specification consists of the several sections listed below.

Overview Of The Apparatus And Method For Fabricating Columns

Apparatus For Fabricating A Unitary Column Mold

Method Of Fabricating A Unitary Column Mold

Apparatus For Fabricating A Column

Method Of Fabricating A Column

Apparatus For Extracting A Column From A Unitary Column Mold

Method Of Extracting A Column From A Unitary Column Mold

The "apparatus" sections introduce components and describe their orientation and interconnections, while describing examples of acceptable components. The "method" sections describe the operation or use of the components.

Overview Of The Apparatus And Method For Fabricating Columns

Figure 1:
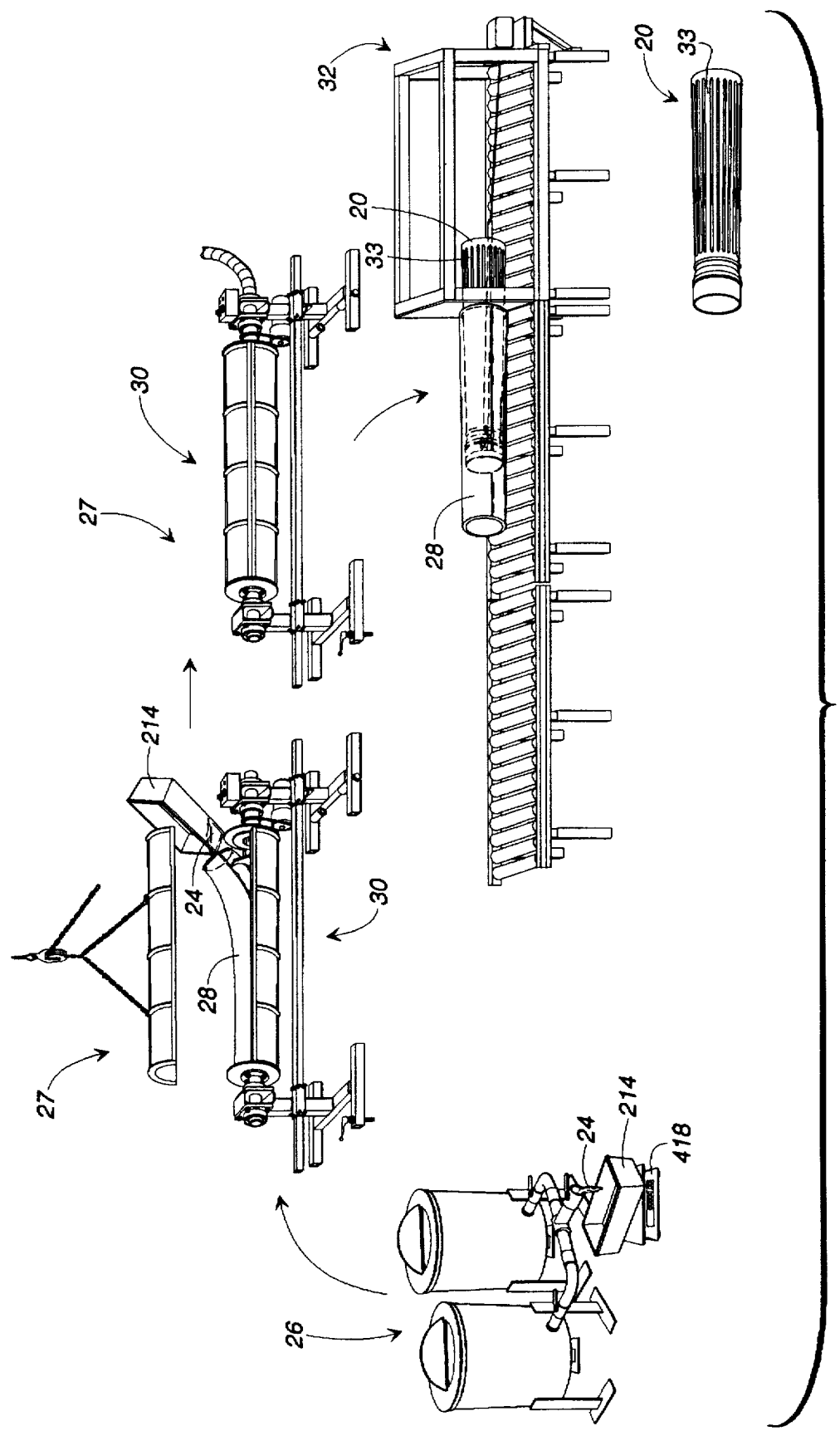
FIG. 1 is a plan over-view of components used for fabricating columns and includes mixers used to mix uncured column material, a unitary column mold sitting within an open mold support assembly, a closed mold support assembly, a column extracting apparatus with a unitary column mold and a fiberglass column thereon, and a fluted fiberglass column.

FIG. 1 is a plan overview of some of the components used to fabricate a hollow fiberglass column 20. In very general terms, several steps are taken to fabricate the column 20. First, uncured column materials 24 are mixed in mixers 26. Then the uncured column materials 24 are introduced to a column fabricating assembly 27. The column fabricating assembly 27 includes a unitary column mold 28 and a mold support assembly 30. The unitary column mold 28 is fabricated specially for the task of fabricating the column 20 therefrom. After the unitary column mold 28 is placed within the mold support assembly 30, the uncured column materials 24 are placed into the unitary column mold 28, and the unitary column mold 28 is enclosed in the mold support assembly 30. The uncured column materials 24 then cure to form the column 20 while the unitary column mold 28 is encased in and spun by the mold support assembly 30. The unitary column mold 28 is eventually removed from the mold support assembly 30 with the column 20 therein. A column extractor 32 is used to extract the column 20 from the unitary column mold 28. The unitary column mold 28 is secured by the column extractor 32, and the column extractor 32 pulls the column 20 out of the unitary column mold 28. In the herein depicted example of the preferred embodiment, the column 20 includes a column outer surface 33 which is fluted. The preferred embodiment of the present invention includes other examples wherein a variety of alternately shaped column outer surfaces 33 are selectively utilized, including nonfluted outer surfaces.

Apparatus For Fabricating A Unitary Column Mold

Figure 2:
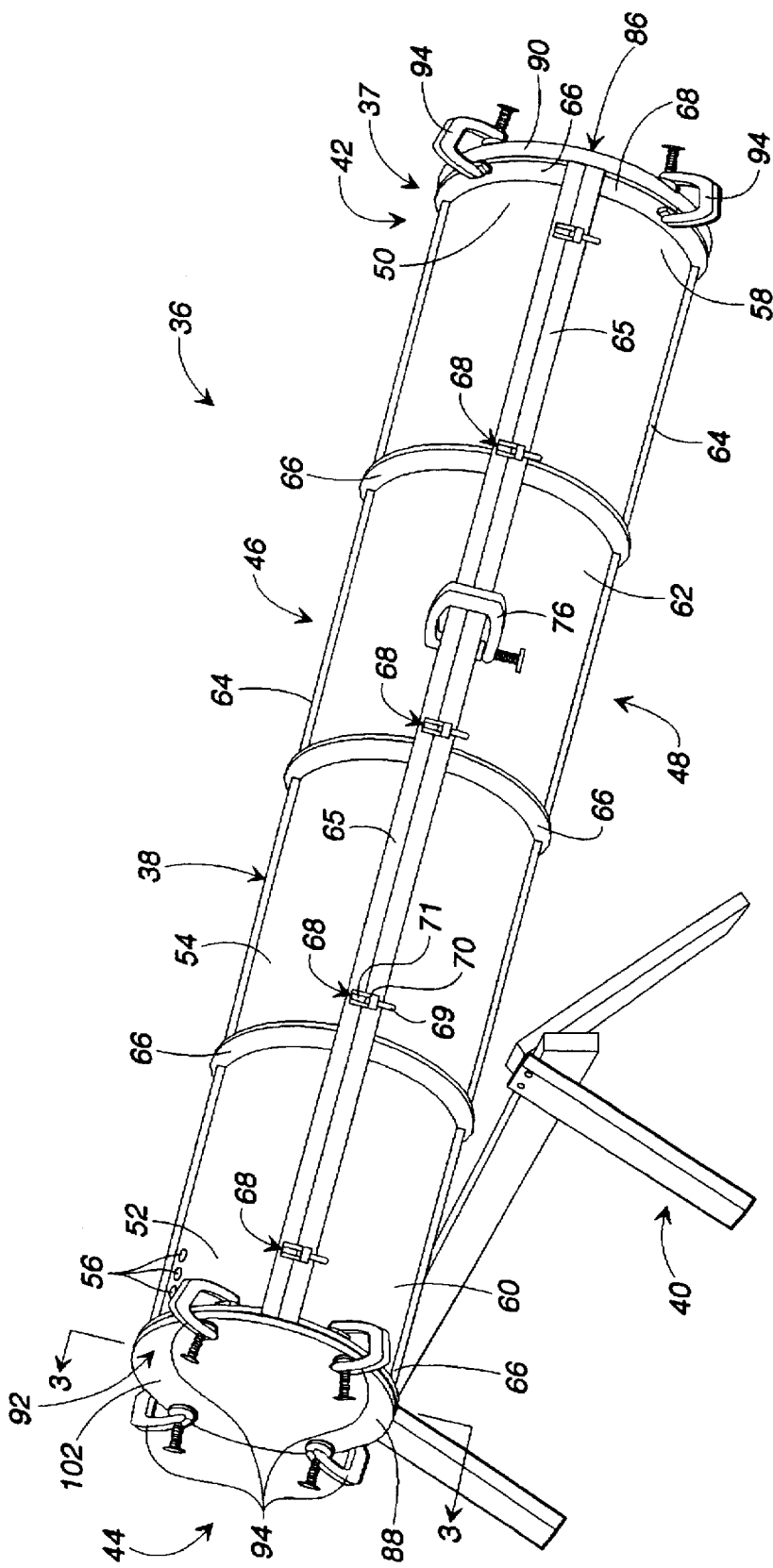
FIG. 2 is a perspective view of a mold fabricating apparatus in accordance with the preferred embodiment of the present invention.

FIG. 2 is a perspective view of a mold fabricating apparatus 36 in accordance with the preferred embodiment of the present invention. The mold fabricating apparatus 36 includes a mold assembly 37 propped upon a saw-horse 40. The mold assembly 37 includes a shell 38, a base closure 86, and a top closure 88. The shell 38 defines a shell base end 42 and a shell top end 44, and includes an upper shell 46 and a lower shell 48. The base closure 86 is shown including a base endplate 90, and the top closure 88 is shown including a top endplate 92. The upper shell 46 includes an upper shell base end 50, an upper shell top end 52, and an upper shell wall 54. The upper shell wall 54, near the shell top end 44, defines a plurality of vent holes 56 therethrough. The lower shell 48 includes a lower shell base end 58, lower shell top end 60, and a lower shell wall 62. A plurality of longitudinal ribs 64, longitudinal engagement ribs 65, and arc ribs 66 (some of which are hidden from view) are attached to the upper shell wall 54 and lower shell wall 62, respectively, and provide rigidity thereto. Although not shown in the figures herewith, in some embodiments of the present invention, the upper shell wall 54, longitudinal ribs 64, longitudinal engagement ribs 65, and arc ribs 66 on the upper shell wall 54 are coated with a sheet of fiberglass to further rigidify the upper shell 46. Likewise, the lower shell wall 62, longitudinal ribs 64, longitudinal engagement ribs 65, and arc ribs 66 on the lower shell wall 62 are coated with a sheet of fiberglass to further rigidify the lower shell 48.

Figure 9:
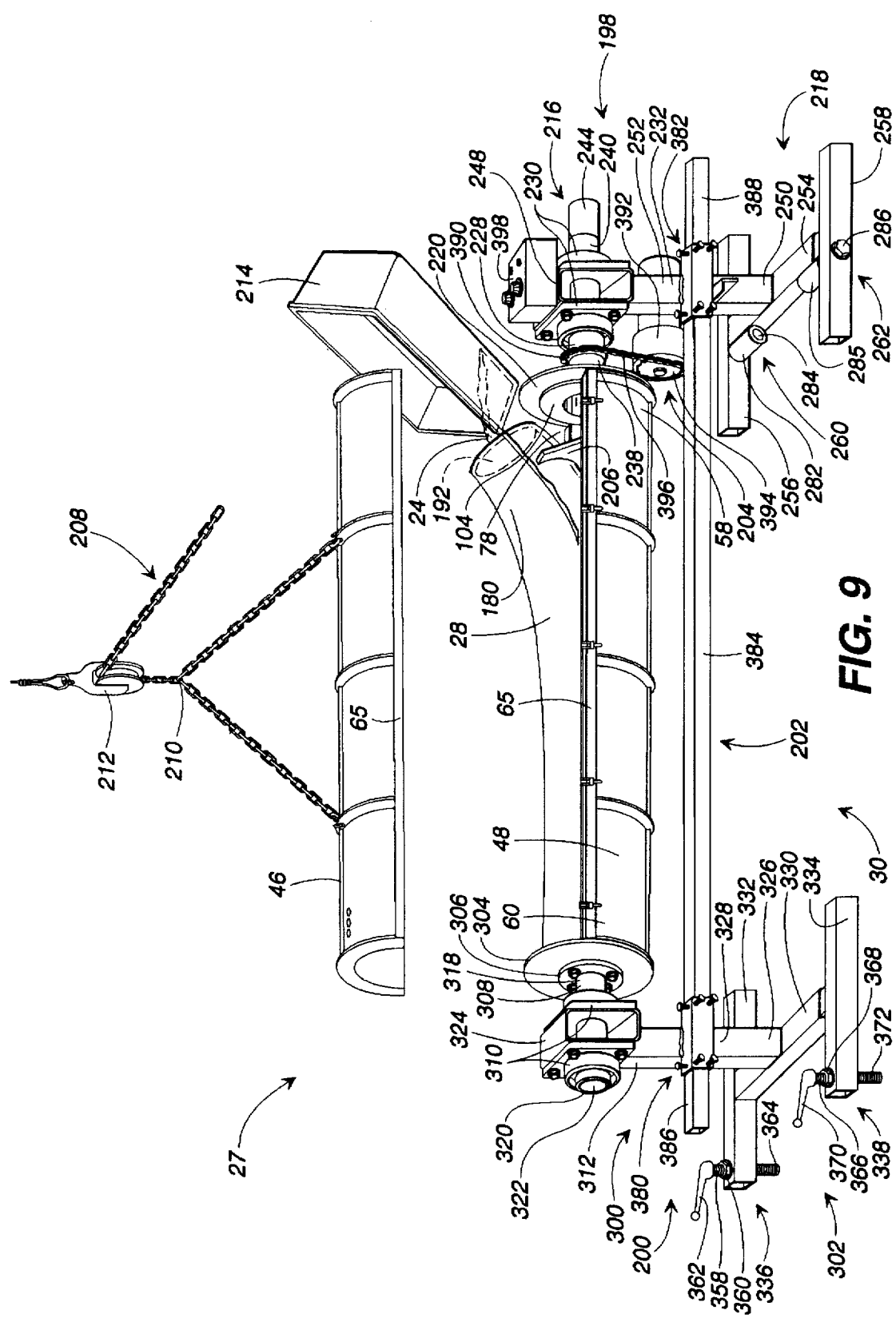
FIG. 9 is a perspective view of the unitary column mold positioned for receiving uncured column material and supported by a partially disassembled and partially cut-away mold support assembly, in accordance with the preferred embodiment of the present invention.

Referring further to FIG. 2, the upper shell 46 and lower shell 48 are releasably connected. (FIG. 9 shows the upper shell 46 and lower shell 48 disconnected.) Engagement between the upper shell 46 and lower shell 48 occurs between the pair of longitudinal engagement ribs 65 which are part of the upper shell 46 and the pair of longitudinal engagement ribs 65 which are part of the lower shell 48. Locking and releasable engagement between the upper shell 46 and the lower shell 48 is facilitated, in part, by a plurality of shell latches 68 connected to the upper shell and lower shell 48. The shell latches 68 include a latch lever 69 pivotally attached to the lower shell 48, a latch hoop 70 pivotally attached to the latch lever 69, and a latch hook 71 connected to the upper shell 46. Each latch hoop 70 releasably engages a latch hook 71. In the preferred embodiment of the present invention, longitudinal C-clamps 76, as needed, are applied across the longitudinal engagement ribs 65 to assist the latches 68 in releasably connecting the upper shell 46 to the lower shell 48. Four endplate C-clamps 94 are connected across the base endplate 90 and arc ribs 66 at the shell base end 42 to releasably secure the base endplate 90 to the shell base end 42. Similarly, four endplate C-clamps 94 are connected across the top endplate 92 and arc ribs 66 at the shell top end 44 to releasably secure the top endplate 92 to the shell top end 44.

FIG. 3 is a cross-sectional, cut-away view of the mold assembly 37 of FIG. 2 taken along line 3—3 of FIG. 2. As shown in FIG. 3, the upper shell wall 54 and lower shell wall 62 define a shell cavity 78 through the shell 30. The upper shell wall 54 and lower shell wall 62 further define a shell cavity centerline 80 through the shell cavity 78. Vent holes 56 are shown in communication with the shell cavity 78. The shell arc ribs 66 that are at the shell top end 44, the upper shell wall 54, and the lower shell wall 62 define a shell top opening 82. The shell arc ribs 66 that are at the shell base end 42, the upper shell wall 54, and the lower shell wall 62 define a shell base opening 84. The shell cavity 78 extends between and connects the shell base opening 84 and the shell top opening 82.

The base endplate 90 of the base closure 86, which is shown covering the shell base opening 84, includes a base endplate inner face 96 that is oriented toward the shell cavity 78 and that engages the arc ribs 66 at the shell base end 42. The base endplate 90 further includes a base endplate outer face 98 that is oriented opposite the shell cavity 78. A plate fill hole 170 is also shown extending through the base endplate 90. Likewise, the top endplate 92, of the top closure 88, which is shown covering the shell top opening 82, includes a top endplate inner face 100 that is oriented toward the shell cavity 78 and that engages arc ribs 66 at the shell top end 44. The top endplate 92 also includes a top endplate outer face 102 that is oriented opposite the shell cavity 78.

The base closure 86 further includes a base donut 104 engaging the base endplate inner face 96 and occupying the shell base opening 84 within the shell cavity 78. The base donut 104 includes a base donut outer face 108 that engages the base endplate inner face 96, a base donut inner face 110 opposite the base donut outer face 108, and a base donut periphery 112 engaging the upper shell wall 54 and the lower shell wall 62 at the shell base end 42. The base donut 104 defines a base donut hole 114, a base donut centerline 116 through the base donut hole 114, and a donut fill hole 168 aligned with the plate fill hole 170. The shell cavity centerline 80 and base donut centerline 116 are collinear. In the preferred embodiment of the present invention, the base closure 86 further includes a base plug 118 including a base plug outer face 120, a base plug inner face 122, and a base plug sidewall 124 therebetween. The base plug outer face 120 is secured, for example by nailing, to the base donut inner face 110 such that the base plug outer face 120 covers the base donut hole 114 and is centered with the base donut centerline 116, as will be discussed in greater detail below.

Likewise, the top closure 88 further includes a top donut 126 engaging the top endplate inner face 100. The top donut 126 is located inside the shell top opening 82 in the shell cavity 78 at the shell top end 44. The top donut 126 includes a top donut outer face 128 engaging the top endplate inner face 100, a top donut inner face 130 opposite the top donut outer face 128, and a top donut periphery 132 engaging the upper shell wall 54 and the lower shell wall 62 at the shell top end 44. The top donut 126 defines a top donut hole 134 therethrough and a top donut centerline 136 through the top donut hole 134. The shell cavity centerline 80 and top donut centerline 136 are collinear. In the preferred embodiment of the present invention, the top closure 88 further includes a top plug 138 including a top plug outer face 140, a top plug inner face 142, and a top plug sidewall 144 therebetween. The top plug outer face 140 is secured, for example by nailing, to the top donut inner face 130 such that the top plug outer face 140 covers the top donut hole 134 and is centered with the top donut centerline 136, as is discussed below.

The mold fabricating apparatus 36 further includes a master 148 supported within the shell cavity 78. In the preferred embodiment of the present invention, the master 148 is hollow and includes a master wall 150, a master base 152 and a master top 154. The master wall 150 includes a master outer surface 153 and a master inner surface 156 that defines a master cavity 158 from the master base 152 to the master top 154. The master inner surface 156 further defines a master centerline 160 through the master cavity 158. As is specified above with respect to FIG. 1, in the herein described example of the preferred embodiment of the present invention, fluted columns 20 are fabricated. Thus, the master wall 150 includes a master outer surface 153 which includes a plurality of flutes 162 and other decorative features 164. In the herein depicted example of the preferred embodiment of the present invention, the master wall 150 tends toward being cylindrical but is not exactly cylindrical. The master wall 150 tapers such that the master base 152 is larger than the master top 154. As is suggested above, other examples of masters 148 define a variety of alternately shaped master outer surfaces 153.

In the preferred embodiment of the present invention, the master top 154 engages the top donut inner face 130, and the master base 152 engages the base donut inner face 110. The base plug 118 protrudes into the master cavity 158 at the master base 152, and the base plug sidewall 124 engages the master inner surface 156. The top plug 138 protrudes into the master cavity 158 at the master top 154 and the top plug sidewall 144 engages the master inner surface 156. The master centerline 160 is collinear with the shell cavity centerline 80. The master outer surface 153, the upper shell wall 54, and the lower shell wall 62 define a mold void 166 therebetween. In an alternate embodiment of the present invention, the master 148 is solid rather than hollow and is connected directly to the donuts 104, 126 so that the solid master 148 is centered within the shell cavity 78.

FIGS. 4 and 5 are cross-sectional cut-away views of the mold fabricating apparatus of FIG. 2 taken along line 4—4 and line 5—5 of FIG. 3, respectively. FIG. 4 shows that the base plug outer face 120 includes base plug center indicator 125. Likewise, the top plug outer face 140 (see FIG. 3) includes a top plug center indicator (not shown). Also, the donut fill hole 168 is shown defined through the base donut 104. The donut fill hole 168 is in communication with the mold void 166. Fewer flutes 162 are shown in FIG. 5 than in FIG. 3 for simplicity.

In the preferred embodiment of the present invention, the upper shell wall 54 and lower shell wall 62 are constructed of sheet metal as an acceptable example. The longitudinal ribs 64, longitudinal engagement ribs 65, and arc ribs 66 are constructed of metal as an acceptable example and are welded to the upper shell wall 54 and lower shell wall 62. The shell latches 68 (FIG. 2) are also constructed from metal as an acceptable example. As an acceptable example, the longitudinal C-clamps 76 and endplate C-clamps 95 (FIG. 2) are conventional C-clamps, as would be understood by one reasonably skilled in the industry. The base endplate 90 and the top endplate 92 are, as an acceptable example, constructed from plywood, and the base donut 104 and the top donut 126 are constructed from rigid plastic material as an acceptable example. The base plug 118 and top plug 138 are, as an acceptable example, constructed from wood or rigid plastic. In the preferred embodiment of the present invention, the master 148 is constructed of fiberglass as an acceptable example.

In alternate embodiments of the present invention, the shell walls 54, 62 are made of fiberglass, and the longitudinal ribs 64, longitudinal engagement ribs 65, and arc ribs 66 are fabricated from wood. In the alternate embodiment of the present invention, in which the master 148 is solid, the master 148 is constructed from wood or some other common column material.

FIG. 6 is a perspective view of a unitary column mold 28 fabricated from the mold assembly 37, as is discussed below, in accordance with the preferred embodiment of the present invention. FIGS. 7 and 8 are cross-sectional views of FIG. 6 taken along line 7—7 and line 8—8 of FIG. 6, respectively. As shown in FIGS. 6, 7 and 8, the unitary column mold 28 includes a mold wall 184, a mold base 180, and a mold top 182. The mold wall 184 includes a mold outer surface 186 and defines a contoured mold inner surface 188. The mold outer surface 186 includes parting lines 190 that protrude outward from the mold outer surface 186 and extend the length of the unitary column mold 28. The mold inner surface 188 defines a mold cavity chamber 192 that extends from the mold base 180 to the mold top 182. The mold inner surface 188 also defines a mold centerline 193 through the mold cavity 192. In the herein depicted example of the preferred embodiment of the present invention, the mold inner surface 188 includes flute protrusions 194 and other decorative protrusions and indentions 196 which reflect the flutes 162 and other decorative features 164 on the master 148 (FIG. 3). For simplicity, fewer flute protrusions 194 are shown in FIG. 8 than are shown in FIG. 7. In alternate examples of the preferred embodiment of the present invention, the mold inner surface 188 does not include flute protrusions 194 but includes other decorative protrusions and indentations 194. In the herein depicted example of the preferred embodiment of the present invention, the mold cavity 192 includes a first width at the mold base 180, a second width at the mold top 182, and a third width defined across an intermediate portion of the mold cavity, and wherein the unitary column mold 28 and the mold cavity 192 are larger in diameter at the mold base 180 than at the mold top 182, and the unitary column mold 28 and the mold cavity 192 taper therebetween.

Method Of Fabricating A Unitary Column Mold

The first step in fabricating a unitary column mold 28 (FIG. 6) is to determine the desired size of the unitary column mold 28 and the desired characteristics of the mold inner surface 188. Once this determination is made, the appropriately sized and shaped master 148 (FIG. 3), the appropriately sized shell 38 (FIG. 3), and other necessary equipment is obtained. Then the mold assembly 37 and sawhorse 40 of the mold fabricating apparatus 36 are assembled and positioned as shown in FIG. 2.

Referring to FIG. 3, when assembling the mold assembly 37 it is crucial that the master 148 be centered within the shell cavity 78; the importance of this is made clear below. Centering is facilitated, in the preferred embodiment of the present invention, by centering the top plug outer face 140 and base plug outer face 120 relative to the top donut centerline 136 and the base donut centerline 116, respectively. Centering of the base plug 118 is carried out, for example, by: (i) orienting the base donut inner face 110 close the base plug 118; (ii) observing the base plug center indicator 125 through the base donut hole 114 (FIG. 4); (iii) simultaneously centering the base plug center indicator 125 relative to the base donut centerline 116 and bringing the base plug outer face 120 into contact with the base donut inner face 110. Once centered, the base plug 118 is secured, for example, by being nailed to the base donut 126. Centering of the top plug 138 is then accomplished in a similar manner. In the alternate embodiment of the present invention, in which a solid master 148 is used, top and base center indicators on the solid master 148 itself are viewed in a similar manner through the donut holes 114, 134 before the solid master 148 is secured directly to the donuts 104, 126.

In accordance with the preferred embodiment of the present invention, once the top plug 138 is secured to the top donut 126, the top plug inner face 142 is inserted into the master cavity 158 at the master top 154. Likewise, once the base plug 118 is secured to the base donut 104 the base plug inner face 122 is inserted into the master cavity 158 at the master base 152. Since the plugs 118, 138 are sized to match the size of the master cavity 158 at the master top 154 and master base 152, the plugs 118, 138 fit snugly within the master cavity 158. The master 148 and attached top donut 126 and base donut 104 are then set within the lower shell 48 such that the top donut periphery 132 engages the lower shell wall 62 at the lower shell top end 60 and the base donut periphery 112 engages the lower shell wall 62 at the lower shell base end 58. Then the upper shell 46 is engaged to the lower shell 48 such that the top donut periphery 132 engages the upper shell wall 54 at the upper shell top end 52 and the base donut periphery 112 engages the upper shell wall 54 at the upper shell base end 50. The upper shell 46 is then secured to the lower shell 48 by closing the shell latches 68 (FIG. 2) and applying the longitudinal C-clamps 76 (FIG. 2). The shell base opening 84 and shell top opening 82 are closed by securing, with endplate C-clamps 94 (FIG. 2), the base endplate 90 and top endplate 92 to the shell base end 42 and shell top end 44, respectively. Likewise, in the alternate embodiment of the present invention in which a solid master 148 is used, the solid master 148, with the top donut 126 and base donut 104 attached thereto, is set within the lower shell 48 and secured within the shells 46, 48 in a manner similar to the preferred embodiment.

Once the mold assembly 37 is assembled, it is propped upon the saw horse 40 such that it is configured as shown in FIG. 2 with the vent holes 56 at a high point. Then uncured mold material is pumped through the plate fill hole 170 and donut fill hole 168 so that the mold void 166 is filled with uncured material. Uncured mold material will run from the vent holes 56 when the mold void 166 is filled. Once the mold void 166 is filled, the plate fill hole 170 is plugged, and the uncured column material is allowed to cure to form a unitary column mold 28 around the master 148. Once the unitary column mold 28 is formed, the longitudinal C-clamps 76 are removed, the shell latches 68 are unlatched, and the upper shell 46 is separated from the lower shell 48. Then the unitary column mold 28, with the master 148 encased therein, is removed from the mold fabricating apparatus 36. The master 148 is then removed from the unitary column mold 28 in an extraction method described below.

In accordance with the preferred embodiment of the present invention, the unitary column mold 28 is flexible and compliant so that it can be used and reused, as is discussed below. The unitary column mold 28 is also sufficiently thick so that it does not collapse and can be used and reused in the manner discussed below.

As is discussed above, in the preferred embodiment of the present invention, unitary column molds 28 of different sizes are made by varying the size of the various components of the mold assembly 37. In one particular example of the preferred embodiment of the present invention, the outer diameter of the unitary column mold 28 is ten inches, the inner diameter of the unitary column mold 28 at the narrowest point is six inches, the inner diameter of the unitary column mold 28 at the widest point is eight inches, and the length of the unitary column mold 28 is eight feet. In accordance with the preferred embodiment of the present invention, as is discussed below, a column 20 is formed within the unitary column mold 28. In one particular example of the preferred embodiment of the present invention, in which a column 20 is formed from a unitary column mold 28 having the above dimensions, the outer diameter of the column 20 at the narrowest point is six inches, the outer diameter of the column 20 at the widest point is eight inches, the inner diameter of the column 20 is five and one-half inches, and the length of the column 20 is eight feet.

In the preferred embodiment of the present invention, the unitary column mold 28 is constructed of material that provides the flexible and compliant characteristics that allow for reuse of the unitary column mold 28. For example, an acceptable construction material is rubber; silicone rubber, thermoplastic rubber, urethane rubber and other types of rubber. One acceptable construction material of the unitary column mold 28 is RTV2254 SILICONE RUBBER manufactured by Dow Corning and obtained from Silpak in Los Angeles, Calif.

In accordance with an alternate embodiment of the present invention, the unitary column mold 28 is not reusable. In accordance with this alternate embodiment, after a column 20 is formed within the non-reusable unitary column mold 28, as discussed below, the non-reusable unitary column mold 28 is torn or cut-away from the column 20. The thickness and other characteristics of the non-reusable unitary column mold 28 are not as critical as they are for the reusable unitary column mold 28. Similarly, in accordance with another alternate embodiment of the present, the unitary column mold 28 is reused only several times.

Apparatus For Fabricating A Column

Figure 10:
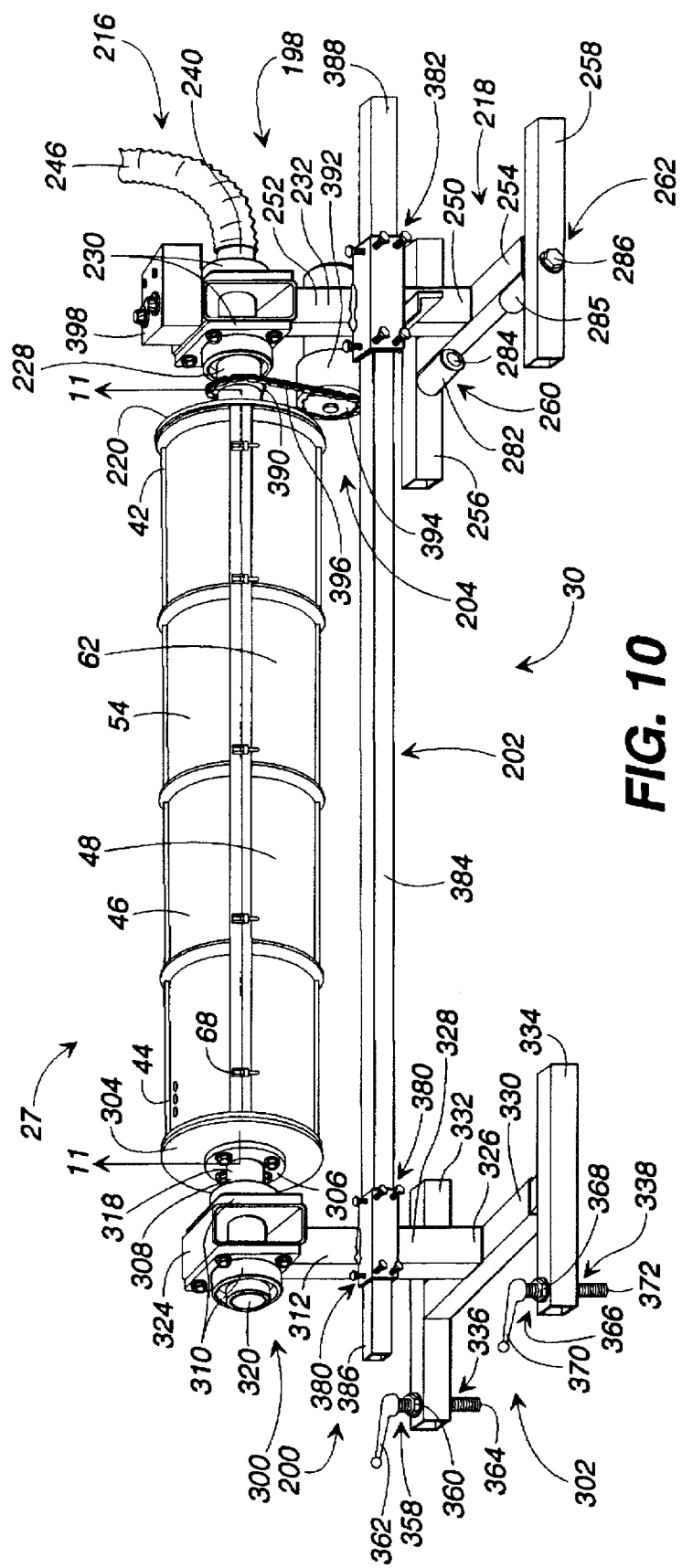
FIG. 10 is a perspective view of the mold support assembly of FIG. 9 in an assembled condition.
Figure 11:
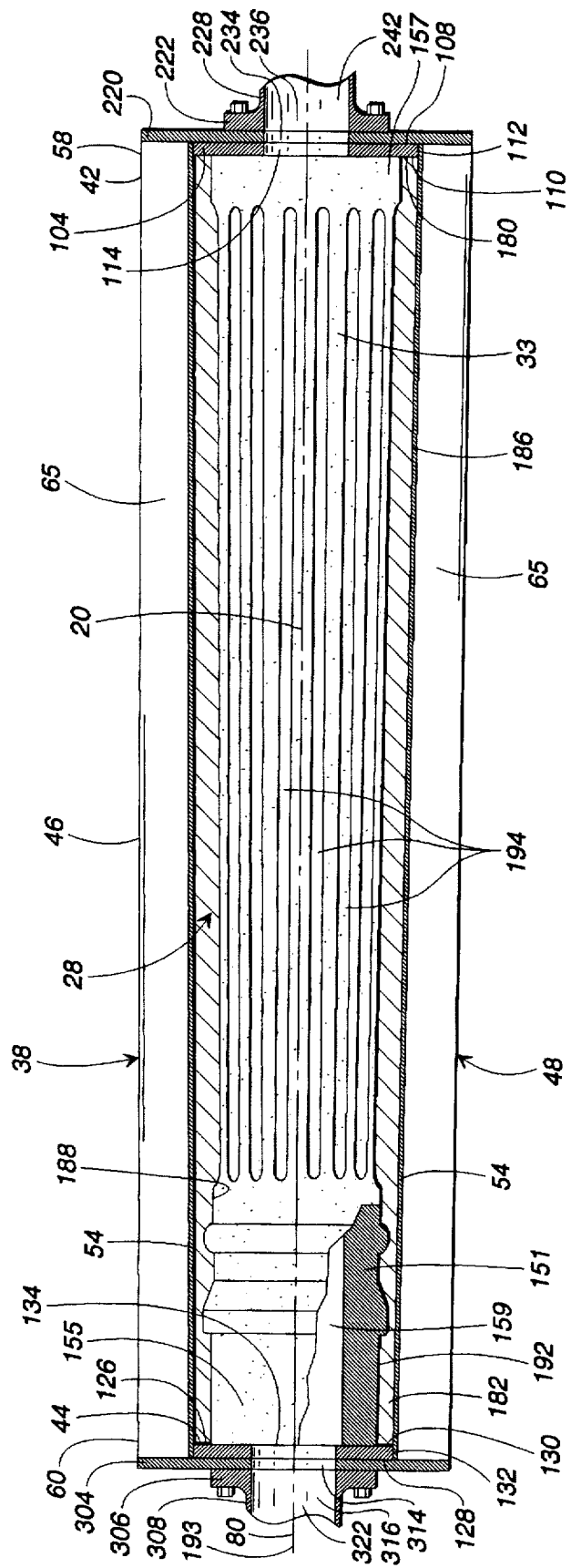
FIG. 11 is a cut-away, cross-sectional view of the mold support assembly of FIG. 10 taken along line 11—11 of FIG. 10.

FIGS. 9 and 10 are perspective views of the column fabricating assembly 27 and FIG. 11 is a cross-sectional, cut-away view taken along line 11—11 of FIG. 10. Referring to FIGS. 9–11, the column fabricating assembly 27 is shown including a mold support assembly 30 for supporting elements which are identical, in the preferred embodiment of the present invention, to previously discussed elements and are, therefore, identified by similar reference numerals and include a lower shell 48, an upper shell 46, a base donut 104, and a top donut 126 (FIG. 11). The upper shell 46 and lower shell 48 define a shell cavity 78 for being occupied by the unitary column mold 28. The mold support apparatus 30 is shown including a base support structure 198, a top support structure 200, a crossmember assembly 202, and a rotation assembly 204. In FIG. 9 the unitary column mold 28 is resting in the lower shell 48. The mold base 180 is elevated and supported by a lifter 206 which causes the flexible unitary column mold 28 to bend as shown. The upper shell 46 is suspended by a tackle assembly 208 that includes chains 210 and a suspended pulley 212. A bucket 214 containing uncured column materials 24 is shown temporarily elevated above the mold base 180.

Referring to FIG. 10, the upper shell 46 is secured to the lower shell 48 by the shell latches 68. Referring to FIG. 11, which is taken immediately above the lower shell 48 to show a cured column 20 in cut-away form, when the unitary column mold 28 is within the shell 38, the mold centerline 193 and shell cavity centerline 80 are collinear. The column 20 is shown defining a column top 155 and a column base 157, and including a column wall 151 defining a column cavity 159 and the column outer surface 33 which is complementary to the mold inner surface 188. The mold outer surface 186 is engaging the upper shell wall 54 and the lower shell wall 62 (FIG. 10). The base donut 104 is located in the shell cavity 78 at the shell base end 42 and the base donut inner face 110 is engaging the mold base 180. The base donut periphery 112 is engaging the upper shell wall 54 and the lower shell wall 62 (FIG. 10) at the shell base end 42. The top donut 126 is located in the shall cavity 78 at the shell top end 44 and the top donut inner face 130 is engaging the mold top 182. The top donut periphery 132 is engaging the upper shell wall 54 and the lower shell wall 62 (FIG. 10) at the shell top end 44.

Referring back to FIG. 9, the base support structure 198 includes an upper base support structure 216 and a lower base support structure 218. The lower shell base end 58 is attached to the upper base support structure 216. The upper base support structure 216 includes a base coupler 220, a base flange 222 (FIG. 11), a base shaft 228, a base bearing assembly 230 and a right support member 232. The lower shell base end 58 is connected by nuts and bolts (which are not shown) to the base coupler 220. Referring to FIG. 11, the base donut outer face 108 engages the base coupler 220. The base coupler 220 defines a base coupler cavity 234 therethrough, and the base coupler 220 is bolted to the base flange 222. The base flange 222 defines a base flange cavity 236 therethrough and the base flange 222 is welded or integral to the base shaft 228. Referring to FIG. 9, the base shaft 228 includes a base shaft inner end 238 connected to the base flange 222 and a base shaft outer end 240 oriented opposite the base flange 222. The base shaft 228 defines a base shaft cavity 242 (FIG. 11) therethrough which extends from the base shaft inner end 238 to the base shaft outer end 240. The base shaft outer end 240 is mounted to the base bearing assembly 230 in a manner that allows the base shaft 228 to rotate relative to the base bearing assembly 230.

Referring to FIG. 11, the base coupler cavity 234, base flange cavity 236, and base shaft cavity 242 are oriented in-line and allow viewing of the shell cavity 78, mold cavity 192, and eventually the column cavity 159 through the base shaft cavity 242. Referring to FIG. 9, a sight tube 244 is attached to the base shaft outer end 240 in a manner that aids in the viewing of the mold cavity 192 through the base shaft cavity 242. Referring to FIG. 10, a vacuum tube 246 is connected to the sight tube 244 and is in communication with the mold cavity 192.

Referring to FIG. 9, the right support member 232 depends from the base bearing assembly 230. The right support member 232 includes a right support member top 248 which is bolted to the base bearing assembly 230, a right support member middle 252, and a right support member bottom 250. The lower base support structure 218 is connected to the upper base support structure 216. The lower base support structure 218 includes a right base central member 254, a right base distal member 256, a right base proximate member 258, a distal pivot assembly 260, and a proximate pivot assembly 262. The right base central member 254 is substantially perpendicular to the right support member 232. The right support member bottom 250 is welded to the right base central member 254.

The right base central member 254 is pivotally connected to the right base distal member 256 by the distal pivot assembly 260. The distal pivot assembly 260 includes a distal pivot tube 282 and a distal pivot bolt hidden from view. The distal pivot tube 282 is welded to the right base central member 254 and bolted to the right base distal member 256 at a sufficiently elevated position and in a manner that secures the right base distal member 256 to the right base central member 254 while allowing the right base central member 254 to pivot relative to the right base distal member 256. The right base central member 254 is pivotally connected to the right base proximate member 258 in a similar manner through the proximate pivot assembly 262 which is shown including a proximate pivot tube 285 and a proximate pivot bolt 286.

The top support structure 200 includes an upper top support structure 300 and a lower top support structure 302. The lower shell top end 60 is attached to upper top support structure 300. The upper top support structure 300 includes a top coupler 304, a top flange 306, a top shaft 308, a top bearing assembly 310, and a left support member 312. The lower shell top end 60 is bolted to the top coupler 304.

Referring to FIG. 11, the top donut outer face 128 engages the top coupler 304, and the top coupler 304 defines a top coupler cavity 314 therethrough. The top coupler 304 is bolted to the top flange 306. The top flange 306 defines a top flange cavity 316 therethrough. The top flange 306 is welded or integral to the top shaft 308. Referring to FIG. 9, the top shaft 308 includes a top shaft inner end 318 connected to the top coupler 304 and a top shaft outer end 320 oriented opposite the top coupler 304. The top shaft 308 defines a top shaft cavity 322 (FIG. 11) therethrough, from the top shaft inner end 318 to the top shaft outer end 320. The top shaft outer end 320 is mounted to the top bearing assembly 310 in a manner that allows the top shaft 308 to rotate relative to the top bearing assembly 310, as would be understood by those reasonably skilled in the industry. The left support member 312 depends from the top bearing assembly 310. The left support member 312 includes a left support member top 324, a left support member middle 328, and a left support member bottom 326. The left support member top 324 is bolted to the top bearing assembly 310 in a manner that would be understood by those reasonably skilled in the industry.

The lower top support structure 302 is connected to the upper top support structure 300. The lower top support structure 302 includes a left base central member 330, a left base distal member 332, a left base proximate member 334, a distal elevation assembly 336, and a proximate elevation assembly 338. The left support member bottom 326 terminates at and is welded to the left base central member 330 which is substantially perpendicular to the left support member 312. The left base distal member 332 and left base proximate member 334 are substantially parallel to the shell cavity centerline 80 (FIG. 11). The left base central member 330 is connected, for example, by welding, to the left base distal member 332 and the left base proximate member 334.

The distal elevation assembly 336 includes a distal adjustment bolt 358 and a distal adjustment nut 360. The distal adjustment bolt 358 includes a distal bolt head 362 that is shaped for ease of engagement and further includes a distal threaded shaft 364 that depends from the distal bolt head 362 and passes through the left base distal member 332 to engage the floor. The distal adjustment nut 360 is secured to the left base distal member 332. The distal threaded shaft 364 passes through and is in threaded engagement with the distal adjustment nut 360. The proximate elevation assembly 338 includes a proximate adjustment bolt 366 and a proximate adjustment nut 368. The proximate adjustment bolt 366 includes a proximate bolt head 370 that is shaped for ease of engagement and further includes a proximate threaded shaft 372 that depends from the proximate bolt head 370 and passes through the left base proximate member 334 to engage the floor. The proximate adjustment nut 368 is secured to the left base proximate member 334. The proximate threaded shaft 372 passes through and is in threaded engagement with the proximate adjustment nut 368.

Referring to FIG. 9, the crossmember assembly 202 connects the base support structure 198 to the top support structure 200. The crossmember assembly 202 includes a left frame assembly 380, a right frame assembly 382, and a horizontal crossmember 384. The left frame assembly 380 is connected, for example by welding, to the left support member middle 328. The left frame assembly 380 defines an accessible left frame cavity (not seen in the figures herewith) that accommodates free lateral movement of the horizontal crossmember 384. The horizontal crossmember 384 is substantially parallel to the shell cavity centerline 80 (FIG. 11) and includes a crossmember left end 386, which passes through the left frame cavity, and a crossmember right end 388. Bolts thread through the left frame assembly 380 to allow for the selective securing of the horizontal cross member 384 within the left frame cavity defined by the left frame assembly 380 as would be understood by those reasonably skilled in the industry. The crossmember right end 388 is connected to the right frame assembly 382 in a similar manner.

The rotation assembly 204 includes a sprocket 390, an electric motor 392, gear 394, drive chain 396, and motor controller 398. The sprocket 390 encircles and is securely attached to the base shaft 228 between the base shaft outer end 240 and the base shaft inner end 238. The electric motor 392 is securely mounted to the right support member middle 252 opposite from the right frame assembly 382 in a manner that would be understood by those reasonably skilled in the industry. The electric motor 392 is connected to and drives the gear 394. The gear 394 is connected by the drive chain 396 to the sprocket 390 assembly in a manner that causes the shell to rotate about the shell cavity centerline 80 when the electric motor 392 operates. Operation of the electric motor 392 is controlled by the motor controller 398. The motor controller 398 is connected to and operates the electric motor 392 in a manner that would be understood by those reasonably skilled in the industry. The motor controller 398 controls the speed at which the electric motor 392 operates and thus the speed at which the shell, and therefore the unitary column mold 28, rotates.

Figure 12:
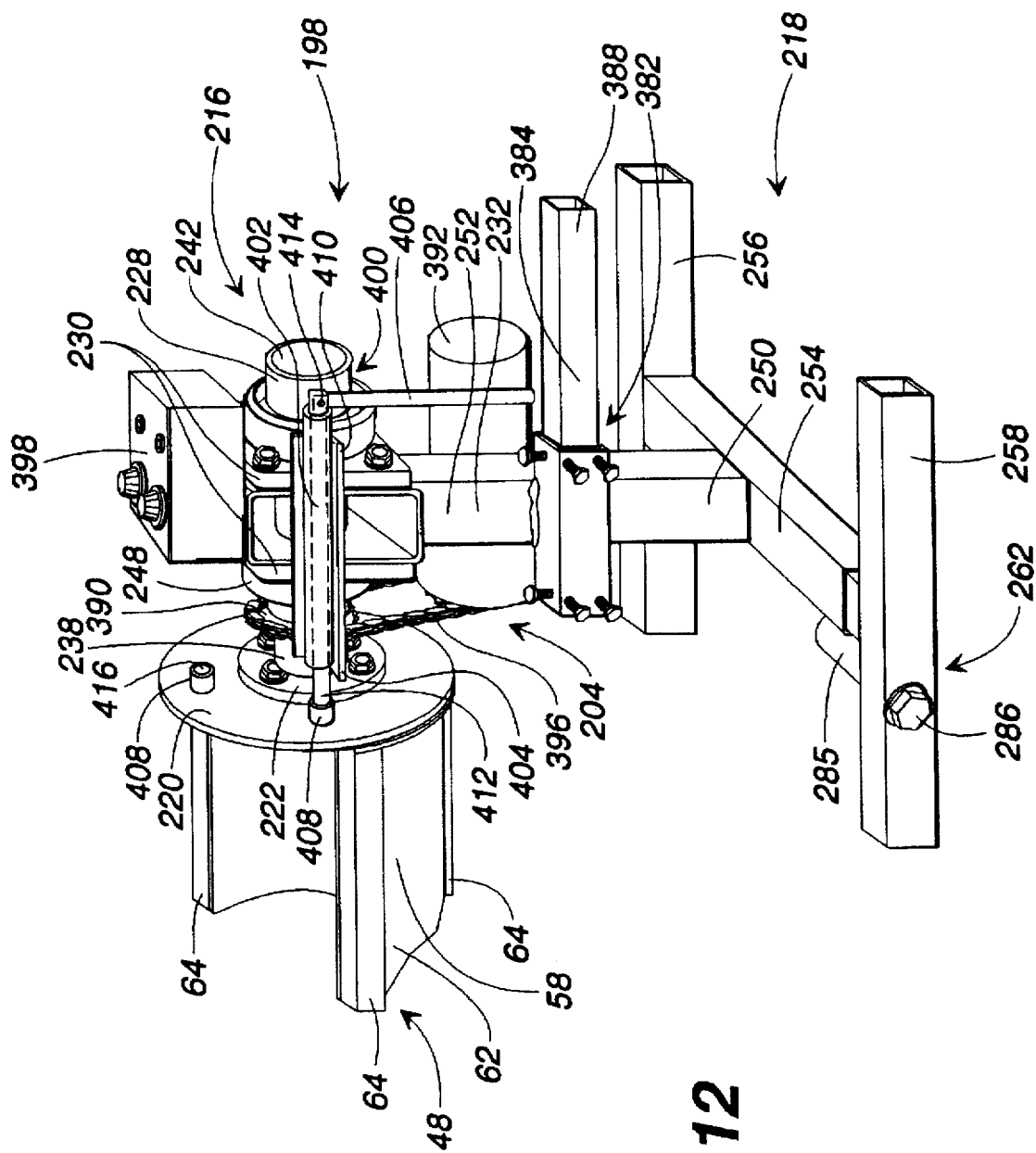
FIG. 12 is a cut-away view of the mold support assembly in accordance with the preferred embodiment of the present invention.

Referring to FIG. 12, which is a detailed cut-away view of a portion of the mold support assembly 30, the mold support assembly 30 further includes a locking assembly 400. The locking assembly 400 is cut-away from FIGS. 9 and 10 in an effort to simplify those figures. The locking assembly 400 includes a lock tube 402, an engagement rod 404, a lock handle 406, and a plurality of rod receivers 408. The lock tube 402 is securely mounted to the right support member top 248 above the right frame assembly 382. The lock tube 402 is welded to a piece of angle iron 410 that is welded to the right support member top 248. The engagement rod 404 is movably housed in the lock tube 402 (as is shown by the hidden lines) and the lock tube 402 is oriented to allow movement of the engagement rod 404 toward and away from the base coupler 220 along a line that is substantially perpendicular to the base coupler 220. The engagement rod 404 has an engagement end 412 and a handle end 414 opposite from the engagement end 412. The lock handle 406 extends perpendicularly from the handle end 414 of the engagement rod 404. The rod receivers 408 are fastened to the base coupler 220 (only two rod receivers 408 are shown in FIG. 12 for simplicity). Each rod receiver 408 includes an accessible receiver cavity 416. Each rod receiver 408 is positioned so that the shell 38 is capable of being locked at pre-selected rotational positions by moving the engagement rod 404 toward the base coupler 220 and locating the engagement end 412 of the engagement rod 404 in one of the receiver cavities 416. Once locked in place, the shell 38 is capable of being unlocked by withdrawing the engagement end 412 from the receiver cavity 416.

In the preferred embodiment of the present invention, the base support structure 198 and top support structure 200 are fabricated from, as an acceptable example, structural metal. The bottom bearing assembly 230 and top bearing assembly 310 incorporate pillow block bearings as an acceptable example. The rotation assembly 204 incorporates components as would be understood by those reasonably skilled in the industry.

Method Of Fabricating A Column

The first step of fabricating a column is to determine the type and size column 20 that is to be produced. Then, the appropriate unitary column mold 28 is selected. The shell 38 that was used to fabricate the selected unitary column mold 28 should be used with the selected unitary column mold 28 for reasons that are discussed below. Prior to fabricating a column 20 within the unitary column mold 28, the mold inner surface 188 of the unitary column mold 28 is coated with a release agent by spraying the release agent thereon. A rod-mounted circular spray nozzle is inserted into the unitary column mold 28 to apply the release agent, according to the preferred embodiment of the present invention.

Next the column fabricating assembly 27 is assembled with the selected unitary column mold 28 and shell 38 as shown in FIG. 9. In order to attach the selected shell 38 to the top support structure 200 and the base support structure 198 the bolts in the right frame assembly 382 and the left frame assembly 380 are loosened so that the horizontal crossmember 384 can move relative to the right frame assembly 382 and the left frame assembly 380. Then the base support structure 198 and top support structure 200 are moved toward or away from each other so that the selected lower shell 48 will just fit between the base coupler 220 and top coupler 304. Then the lower shell base end 58 is attached to the base coupler 220 and the lower shell top end 60 is attached to the top coupler 304, and the bolts in the right frame assembly 382 and the left frame assembly 380 are tightened to rigidify the column fabricating assembly 27. Then the column fabricating assembly 27 is adjusted so that the lower shell base end 58 is elevated above the lower shell top end 60. Adjustment is made by using the proximate elevation assembly 338 and the distal elevation assembly 336; the proximate bolt head 370 and distal bolt head 362 are engaged and turned accordingly. At some point in this process the locking assembly 400 is employed to lock the lower shell 48 in the position shown in FIG. 9. Then the base donut 104 is placed adjacent to the base coupler 220, and the top donut 126 is placed next to the top coupler 304 as is shown in FIG. 11 and discussed above. Next, the selected unitary column mold 28 is placed in the lower shell 48 with the mold top 182 against the top donut 126 as shown in FIG. 11 and with the mold base 180 suspended by the lifter 206 as shown in FIG. 9.

Once the column fabricating assembly 27 is configured as shown in FIG. 9, column materials 24 must be prepared. As shown in FIG. 1, uncured column materials 24 are mixed in mixers 26. Then, depending on the desired thickness of the column 20, the appropriate amount of uncured column material 24 is drained from the mixers 26 into a bucket 214. A scale 418 is employed under the bucket 214 and is relied upon to determine when the appropriate amount of uncured column materials 24 is obtained. A catalyst is blended into the uncured column materials 24 in the bucket 214 to promote and speed the curing of the uncured column materials 24.

Once the bucket 214 is appropriately filled with uncured column materials 24, the bucket 214 of uncured column materials 24 is poured into the mold cavity 192 as shown in FIG. 9. Then the column fabricating assembly 27 is configured as shown in FIGS. 10 and 11; the lifter 206 is removed, the mold base 180 is placed in contact with the base donut 104, and the upper shell 46 is latched to the lower shell 48.

Once the column fabricating assembly 27 is configured as shown in FIGS. 10 and 11, with uncured column material 24 within the mold cavity 192, the motor controller 398 is used to start and control the speed of the electric motor 392. Of course the locking assembly 400 must be disengaged before the electric motor 392 is started. The shell 38, and the unitary column mold 28 therein, are turned by the electric motor 392 causing the uncured column material 24 to spread about the mold inner surface 188 of the unitary column mold 28. The uncured column material 24 cures while spread about the mold inner surface 188 to form a hollow column 20.

It is important to monitor and control the spreading of the uncured column material about the mold inner surface 188 to ensure that a suitable column 20 is fabricated. As discussed above, the mold base 180 is larger in diameter than the mold top 182. Thus, as the unitary column mold 28 turns, centrifugal force causes the uncured column material 24 to spread toward the mold base 180. As is also discussed above, the column fabricating assembly 27 is adjusted so that the lower shell base end 58 is elevated above the lower shell top end 52; thus, gravity offsets the effect of centrifugal force. However, the speed at which the unitary column mold 28 turns also has an impact on the effect of the centrifugal force. As the turning speed is increased the resulting centrifugal force is increased and more uncured mold material 24 is forced toward the mold base 180. As the turning speed is decreased more uncured mold material 24 is forced toward the mold top under the force of gravity since the shell base end 42 is elevated above the shell top end 44. Therefore, it is important to control the speed at which the unitary column mold 28 is turned to ensure that the column material 24 is spread evenly about the mold inner surface 188. This control is facilitated by looking through the sight tube 244 (FIG. 9) and observing the spreading of the uncured column material 24 about the mold inner surface 188 and by adjusting the speed of the electric motor 392 accordingly. When the sight tube 244 is not being looked through, the vacuum tube 246 is attached thereto to draw fumes from the mold cavity 192.

The importance of centering the master 148 within the shell 38 when fabricating a unitary column mold 28 and using the unitary column mold 28 within the shell 38 from which it was fabricated becomes apparent when the shell 38 is turned. If the mold centerline 193 and shell cavity centerline 80 are not collinear when the shell 38 is turned the uncured column materials 24 within the mold cavity 192 do not spread evenly about the mold inner surface 188. Also, using the unitary column mold 28 within the shell 38 from which it was fabricated ensures secure engagement between the mold outer surface 186 and the upper shell wall 54 and the lower shell wall 62. If there is not secure engagement the unitary column mold 28 will turn relative to the shell 38 and the uncured column materials 24 will not spread properly. While parting lines on columns 20 are a detriment, parting lines on unitary column molds 28 aid in the secure engagement between the shell 38 and the unitary column mold 28.

As specified above, a column 20 is formed when the uncured column material 24 cures within the unitary column mold 28. Once the column 20 is formed, the electric motor 392 is stopped, the upper shell 46 is unlatched from the lower shell 48, and the upper shell 46 is lifted by the tackle assembly 208. Then the unitary column mold 28, with the column 20 therein, is removed from the column fabricating assembly 27. The column extractor 32 is used to extract the column from the unitary column mold 28, as is discussed below.

The uncured column material 24 formulation and process of using a release agent with a rubber mold is considered to have application in a variety of other alternate embodiments of fiberglass products.

Whereas other materials may be used, at least one example of a preferred embodiment of the present invention utilizes the following acceptable materials:

The release agent sprayed on the mold inner surface 188 is a lubricant. An acceptable lubricant is CT-88 lubricant provided by Chemtrend of Howel, Mich.

The uncured column material 24 includes fiberglass resin, fiberglass strand, and marble dust.

According to this example, 30% of the uncured column material 24 is fiberglass resin. The fiberglass resin can be general purpose casting or laminating resin of the polyester or vinylester type. An acceptable polyester type, general purpose fiberglass resin is UN1866 from Alfa Inc. of Lakeland, Fla. According to this example, the fiberglass resin is prepromoted (1500 cc's of prepromoter per 2950 pounds of resin). The prepromoter is comprised of 50% Cobalt-12 and 50% DMA (N,N Dimethyaniline). An acceptable Cobalt-12 is obtained from OM Group of Franklin, Pa. An acceptable DMA is obtained from Puritan Products of Palmer, Pa. Cobalt and DMA are well known prepromoters in the industry.

According to this example, 6% to 10% of the uncured column material 24 is fiberglass strand. Chopped fiberglass strand with strand lengths of 3/16" to 1/2" is acceptable. Suitable pre-chopped fiberglass strand can be obtained from Owens Corning in Anderson, S.C.

According to this example, the remainder of the uncured column material 24 includes marble dust and 1% pigment if coloration is desired. An example of a suitable white pigment is TIO2 which can be obtained from Dupont of Wilmington, Del. Concerning the marble dust, M-15 Marble Dust, which can be obtained from Georgia Marble in Kennesaw, Ga., is acceptable.

The catalyst that is added to the uncured column material 24, in combination with the composition of the uncured column material 24, results in a cure time of approximately eight to ten minutes. 1.5% to 2% of the catalyst is added for every pound of resin. An example of an acceptable catalyst is DDM-9 (Methyl Ethyl Keytone Peroxides) from ATOCHEM of Buffalo, N.Y.

Apparatus For Extracting A Column From A Unitary Column Mold

FIGS. 13 and 14 are perspective views of the column extractor 32 in accordance with the preferred embodiment of the present invention. Referring to FIGS. 13 and 14, the column extractor 32 includes an extractor frame 430, a resistance assembly 432, a mold roller track assembly 434, a column roller track assembly 436, a winch assembly 437 (part of which is shown in hidden lines in FIGS. 13 and 14), and a column engaging assembly 438 (shown in hidden lines in FIG. 14).

The column extractor frame 430 is in the shape of a rectangular box and includes an extractor frame front 442, an extractor frame rear 446, an extractor frame top 448, and an extractor frame bottom 450. Also, the extractor frame 430 bounds an extractor receiving area 452. The extractor frame 430 includes a pair of juxtaposed, lateral base boards 454. The lateral base boards 454 are connected at the frame rear 446 by a rear transverse base board 456. The lateral base boards 454 are connected at the frame front 442 by a front transverse base board 458. A pair of juxtaposed vertical front boards 460 extend upward from the lateral base boards 454 at the extractor frame front 442. A pair of juxtaposed vertical rear boards 462 extend upward from the lateral base boards 454 at the extractor frame rear 446. A front transverse top board 464 connects the vertical front boards 460. A rear transverse top board 466 connects the vertical rear boards 462 at the extractor frame top 448. The front transverse top board 464 and rear transverse top board 466 are juxtaposed.

A pair of juxtaposed lateral top boards 468 connect the vertical front boards 460 to the vertical rear boards 462 at the extractor frame top 448. The extractor frame 430 further includes a plurality of support posts 440 that depend from and support the extractor frame 430. (Only a couple of the support posts 440 are pointed out in the figures for simplicity.)

Figure 15:
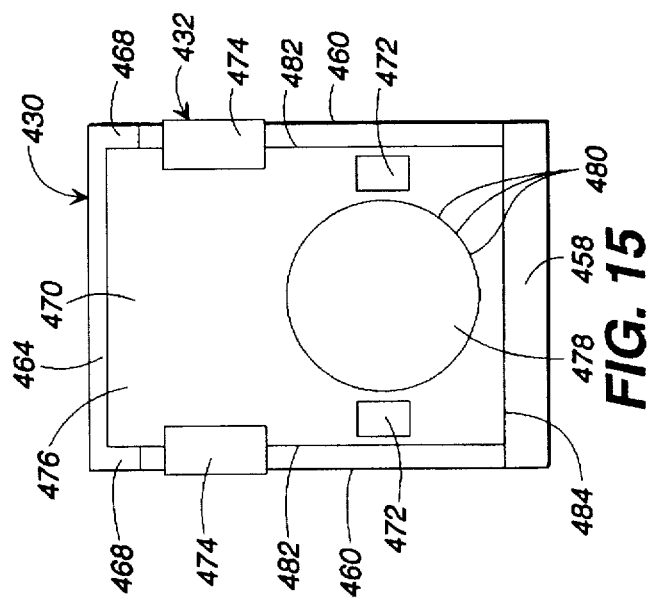
FIG. 15 is a cut-away front view of column extractor of FIG. 13.

FIG. 15 is a front view of the extractor frame 420 and resistance assembly 432. The resistance assembly 432 includes a resistance panel 470, alignment blocks 472 and resistance brackets 474. The resistance panel 470 has a panel front 476 oriented opposite the extraction frame 430. The resistance panel 470 defines an extraction opening 478 therethrough which is sized to allow a column 20 to pass therethrough while preventing the unitary column mold 28 from passing therethrough (FIG. 13). The resistance panel 470 includes a resistance surface 480 on the panel front 476 around the periphery of the extraction opening 478. The alignment blocks 472 are mounted to the panel front 476 adjacent to the resistance surface 480 and are positioned such that when the unitary column mold 28, with a column 20 therein (FIG. 13), is positioned with the mold base 180 between the alignment blocks 472, the mold base 180 engages the resistance surface 480 and the column 20 is aligned with the extraction opening 478 such that the column 20 can pass through the extraction opening 478 (FIG. 14).

The resistance panel 470 further includes a pair of panel side edges 482 and a panel base edge 484. The resistance brackets 474 are connected to the vertical front boards 460. Resistance slots (not seen in the figures herewith) are defined between the resistance brackets 474 and the vertical front boards 460 for receiving the panel side edges 482 therein and for securing the resistance panel 470 to the extractor frame 430 in a removable manner. The resistance panel 470 is also removably secured to the extractor frame front 442 by the front transverse base board 458; the panel base edge 484 engages the front transverse base board 458. The removable nature of the resistance panel 470 allows for the selection and individual employment of a plurality of different resistance panels 470; each of the plurality of resistance panels 470 is sized for a specific size of column 20 and unitary column mold 28.

Referring back to FIGS. 13 and 14, the mold roller track assembly 434 and the column roller track assembly 436 are constructed as would be understood by those reasonably skilled in the industry. The mold roller track assembly 434 and the column roller track assembly 436 provide horizontal support while facilitating lateral movement thereon. This feature is provided by a plurality of longitudinal rollers 488 having opposite ends that are rotatably mounted. The column roller track assembly 436 is disposed between and secured to the lateral base boards 454. The mold roller track assembly 434 is positioned at the frame front 442 and abuts the resistance panel 470. The mold roller track assembly 434 is positioned at a specified elevation such that when a unitary column mold 28, with a column 20 therein, is positioned on the mold roller track assembly 434 with the mold base 180 between the alignment blocks 472 (FIG. 15), the mold base 180 engages the resistance surface 480 (FIG. 15) and the column 20 is aligned with the extraction opening 478 (FIG. 15) such that the column 20 can pass through the extraction opening 478 (FIG. 15). The mold roller track assembly 434 includes a plurality of support posts 440 that depend from and support the mold roller track assembly 434.

The winch assembly 437 includes a winch platform 490, a winch 492, and a cable assembly 494. The winch platform 490 extends horizontally from the rear transverse base board 456, and the winch 492 is mounted thereon. The cable assembly 494 includes a cable 496 having a cable first end 498 and a cable second end 500. (Portions of the cable assembly 494 are shown in hidden lines in FIGS. 13 and 14.) The cable first end 498 is attached to the winch 492. The cable 496 passes through a rigid tube 504 and the cable second end 500 is attached to a cable hook 502. The cable 496 is capable of moving relative to the rigid tube 504 but the rigid tube 504 is constrained to the cable 496 because the cable hook 502 and the winch 492 cannot pass through the rigid tube 504.

Figure 16:
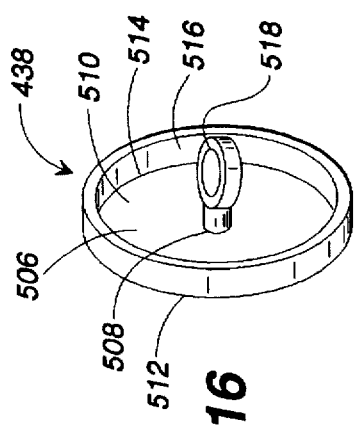
FIG. 16 is a detailed perspective view of a component of the column extractor of FIG. 13.

FIG. 16 is a perspective view of the column engaging assembly 438. Referring to FIG. 16, the column engaging assembly 438 includes a cap plate 506 and a cap eyehook 508. The cap plate 506 is circular and defines a cap hole (which is not shown in the figures herewith) therethrough. The cap plate 506 has an engaging side 510 and a cap perimeter 512. The engaging side 510 defines a cap indenture 514 adjacent to the cap perimeter 512. A cap flange 516 protrudes from the cap perimeter 512 and extends perpendicularly from the engaging side 510. The cap eyehook 508 bolted through the cap plate 506, as shown in FIG. 13. The cap eyehook 508 extends perpendicularly from the engaging side 510 and terminates as an eyelet 518. The eyelet 518 is releasably connectable to the cable hook 502 during use. The releasable nature of the column engaging assembly 438 allows for the selection and individual employment of a plurality of different column engaging assemblies 438; each of the plurality of column engaging assemblies 438 is sized for a specific size of column 20 and unitary column mold 28 (FIG. 13).

In the preferred embodiment of the present invention, the extractor frame 430 and the majority of the resistance assembly 432 is constructed from, as an acceptable example, durable wood. It is important that the wood be sufficiently strong to handle forces applied by the winch 492. Likewise, the cable 496 and associated components must be strong and durable. The resistance brackets 474 and column engaging assembly 438 are, as an acceptable example, constructed from metal. The winch 492 is a standard winch with an electric motor as would be understood by one reasonably skilled in the industry. The mold roller track assembly 434 and column roller track assembly 436 are standard roller track assemblies as would be understood by those reasonably skilled in the industry.

Figure 17:
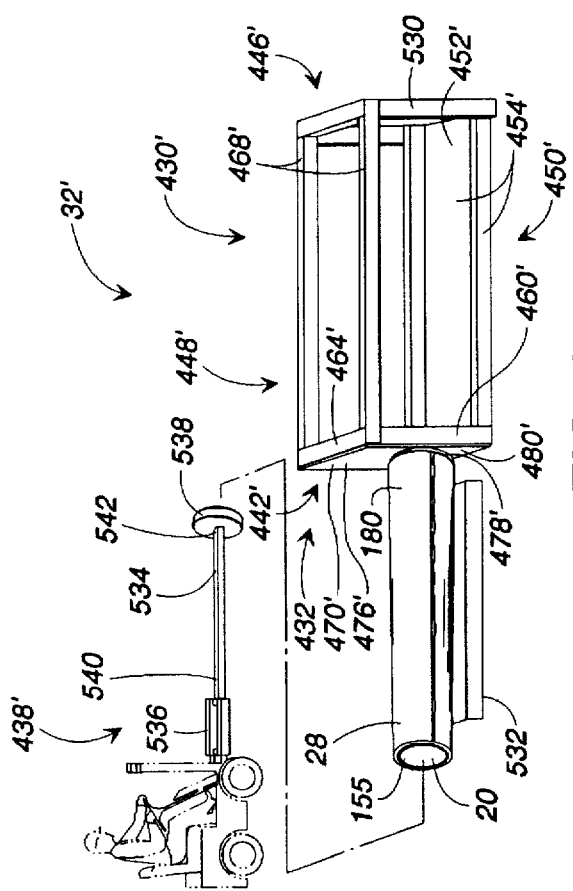
FIG. 17 is a perspective view of a column extractor in accordance with an alternate embodiment of the present invention.

An alternate embodiment of the present invention includes a simplified column extractor 32'. FIG. 17 is a perspective view of the column extractor 32'. The column extractor 32' includes an extractor frame 430', a column resistance assembly 432', and a column engaging assembly 438'.

The extractor frame 430' is in the shape of a rectangular box and includes a extractor frame front 442', an extractor frame rear 446', an extractor frame top 448', and an extractor frame bottom 450'. The extractor frame 430' bounds an extractor receiving area 452'. The extractor frame 430' includes a pair of juxtaposed lateral base boards 454'. A pair of juxtaposed vertical front boards 460' extend upward from lateral base boards 454' at the frame front 442'. A back board 530 is connected to and extends upward from the base boards 454' at the extractor frame rear 446'. A front transverse top board 458' connects the vertical front boards 460'. A pair of juxtaposed lateral top boards 468' connect the vertical front boards 460' to the back board 530 at the frame top 448'.

The resistance assembly 432' includes a resistance panel 470' attached, for example by nailing, to the extractor frame front 442'. The resistance panel 470' has a panel front 476' oriented opposite the extractor frame 430'. The resistance panel 470' defines an extraction opening 478' therethrough which is sized to allow a column 20 to pass therethrough while preventing the unitary column mold 28 from passing therethrough. The resistance panel 470' includes a resistance surface 480' on the panel front 476' around the periphery of the extraction opening 478'. The resistance assembly 432' further includes a pallet assembly 532 positioned at the extraction frame front 442'. The pallet assembly 532 is positioned and sized such that when a unitary column mold 28, with a column 20 therein, is positioned at a specific location on the pallet assembly 532, the mold base 180 engages the resistance surface 480' and the column 20 is aligned with the extraction opening 478' such that the column 20 can pass through the extraction opening 478'.

The column engaging assembly 438' includes an engagement shaft 534, a forklift engaging assembly 536, and a plunger plate 538. The engagement shaft 534 has an engagement shaft first end 540 and an engagement shaft second end 542. The forklift engaging assembly 536 is secured to the engagement shaft first end 540 in a manner that would be understood by those reasonably skilled in the art, for example by welding. The forklift-engaging assembly 536 is designed to engage the pronged platform of a forklift such that the forklift can move, orient, and apply thrust to the forklift engaging assembly 536. The plunger plate 538 is removably secured to the engagement shaft second end 542, for example by bolting. The plunger plate 538 is a circular disk sized to securely engage the master base 152 and pass through the mold cavity 192 (FIGS. 11 and 14). The removable nature of the plunger plate 538 allows for the selection and individual employment of a plurality of different plunger plates 538; each of the plurality of plunger plates 538 is sized for a specific size of column 20 and unitary column mold 28.

Method Of Extracting A Column From A Unitary Column Mold

Referring back to FIGS. 13–15, the column extractor 32 is used to extract a column 20 from a unitary column mold 28 and, as discussed above, used to extract a hollow master 148 from a newly fabricated unitary column mold 28. Prior to using the column extractor 32 a resistance panel 470 is selected. The extraction opening 478 of the resistance panel 470 selected must be properly sized to allow the column 20 that is to be extracted to pass therethrough while preventing the unitary column mold 28 from which the column 20 is to be extracted from passing therethrough. The resistance panel 470 is attached to the extractor frame front 442 With the panel front 476 opposite from the extractor frame 430. The resistance panel is attached to the extractor frame front 442 by sliding the panel side edges 482 through the slots defined by the resistance brackets 474 and allowing the panel base edge 484 to engage the front transverse base board 458.

Once the resistance panel 470 is in-place, the unitary column mold 28, with the column 20 therein, is placed on the mold roller track assembly 434 with the mold base 180 oriented toward the extractor frame front 442. The cable hook 502 is passed through the column cavity 159 from the column base 157. Passing the cable hook 502 through the column cavity 159 is facilitated by using the rigid tube 504. The mold base 180 is placed between the alignment blocks 472 as is shown in FIG. 14.

Once the mold base 180 is between alignment blocks 472 and the cable hook 502 is extending from the column top 155, a column engaging assembly 438 is utilized. A column engaging assembly 438 is selected that will fit over the column top 155 and pass through the mold cavity 192 (FIGS. 11 and 14). The cable hook 502 is hooked to the eyelet 518 of the column engaging assembly 438 and the column engaging assembly 438 is carefully drawn toward the column top 155 by operating the winch 492. As the column engaging assembly 438 draws toward the column 20, the eyelet 518 is passed into the column cavity 159, the column top 155 is encircled by the cap flange 516, and the column top 155 is engaged to the engaging side 510 of the cap plate 506 at the cap indenture 514. Because of this "capping" operation, any extraneous column material flashing extending radially outward from the column top 155 is covered, and scarring damage to the unitary column mold is prevented. The winch 492 is further operated so that mold base 180 comes into firm engagement with the panel front 476 at the resistance surface 480 and the column engaging assembly 438 pushes the column 20 through the mold cavity 192 and extraction opening 478 and into the extractor receiving area 452. When the column 20 passes completely through the extraction opening 478 it comes to rest on the column roller track assembly 436. At that point the column engaging assembly 438 is disengaged, and the cable assembly 494 is removed from the column 20. Then, the column 20 is removed from the extractor receiving area 452, is cooled with cool air, and is packaged for shipment.

As is discussed above, the unitary column mold 28 is flexible; therefore, it gives and expands sufficiently to allow the contoured column outer surface 33 to easily pass through the mold cavity 192. As discussed above, the cap flange 516 covers any sharp features on the column top 155 when it is pushed through the mold cavity 192 so that the unitary column mold 28 is not damaged or altered when the column 20 is extracted therefrom, and since the unitary column mold 28 is also not damaged when the column 20 is formed therein, the unitary column mold 28 is completely reusable.

Referring to FIG. 17, the alternate embodiment column extractor 32' is also used to extract a column 20 from a unitary column mold 28 but can also be used to extract a solid master from a unitary column mold 28. In order to use the column extractor 32', a bulkhead or some other non-movable structure must be engaged by the back board 530 at the extractor frame rear 446'. Then the unitary column mold 28 is placed upon the pallet assembly 532 and the mold base 180 is manually aligned with the resistance surface 480' on the panel front 476'. Then the plunger plate 538 is engaged to the column top 155 and the plunger plate 538 and column 20 are pushed through the mold cavity 192 (FIG. 11) and extraction opening 478'; the unitary column mold 28 is maintained at the extraction frame front 442' while the column 20 is pushed into the extractor receiving area 452'. A solid master can be extracted from a unitary column mold 28 using the column extractor 32' because a cable assembly 494 (FIGS. 13 and 14) is not utilized. Also, the column extractor 32' can be configured to accommodate various sizes of columns 20 and unitary column molds 28.

As is discussed above, one alternate embodiment of the present invention includes a non-reusable unitary column mold 28. In that alternate embodiment, the column 20 is removed from the non-reusable unitary column mold 28 by simply tearing or cutting the non-reusable unitary column mold 28 away from the column 20. Thus, a column extractor 32 is not utilized in that alternate embodiment of the present invention.

Whereas this invention has been described in detail with particular reference to preferred embodiments and alternate embodiments thereof, it will be understood that variations and modifications can be effected within the spirit and scope of the invention, as described herein before and as defined in the appended claims.

We claim:

1. A method of fabricating architectural building columns of the type used for support and ornamentation in building construction, the method comprising the steps of:

depositing uncured column material into an elongated, flexible unitary mold defining an elongated mold chamber;

spinning the mold chamber with the column material therein;

forming within the mold chamber an architectural building column having opposite ends and a mold formed exterior surface that is, intermediate of the ends of the column, absent of any parting lines; and removing the architectural building column from the elongated mold chamber.

2. The method of claim 1, further comprising a step of repeating, multiple times, consecutively, the steps of depositing, spinning, forming, and removing each time utilizing the same mold chamber, wherein all steps are performed without once substantially altering the length and the shape of the mold chamber.

3. The method of claim 1, wherein the removing step comprises steps of:

extracting the column from one end of the elongated mold chamber; and throughout the extracting step, maintaining, substantially, the length and the shape of the mold chamber.

4. The method of claim 1, wherein the removing step comprises a step of extracting the column from one end of the elongated mold chamber without substantially altering, during extraction, the length or the shape of the mold chamber.

5. The method of claim 1, wherein the mold chamber includes a chamber inner wall, the inner surface of which extends completely around a mold cavity and is absent of separate but joinable edges such that the mold chamber does not form a parting line intermediate of the ends of the mold chamber, and wherein the method further comprises a step of maintaining the integrity of the mold chamber during the forming step and the removing step such that the inner surface of the chamber inner wall continuously extends completely around the mold cavity throughout the steps of forming and removing the column.

6. The method of claim 1, wherein the forming step includes the step of forming within the mold chamber the architectural building column having at least one intermediate width that is narrower than a width of each of its ends.

7. The method of claim 1, wherein the column material comprises marble dust and fiberglass resin.

8. The method of claim 7, wherein an amount of marble dust in the column material is in the range of 59% to 63%, and wherein an amount of fiberglass resin in the column material is approximately 30%.

9. The method of claim 7, wherein the fiberglass resin is a polyester fiberglass resin.

10. The method of claim 7, further comprising the step of adding a catalyst to the column material.

11. The method of claim 10, wherein the column material further comprises fiberglass strand.

12. A method for fabricating architectural building columns of the type used for support and ornamentation in building construction, the method comprising the steps of:

providing an elongated, flexible, unitary mold including
a mold first end,
a mold second end opposite from the mold first end,
a mold length defined between the mold first end and the mold second end, and
a mold wall defining a mold inner surface, wherein the mold inner surface defines
a mold chamber extending between the mold first end and the mold second end, wherein an axis of the elongated mold is defined through the mold chamber and extends between the mold first end and the mold second end,
a chamber first width defined across the mold chamber at a position closer to the mold first end than the mold second end,
a chamber second width defined across the mold chamber at a position closer to the mold second end than the mold first end, and
a chamber third width defined across the mold chamber and intermediate of the chamber first width and the chamber second width, wherein the chamber third width is less than each of the chamber first width and the chamber second width, mold length is greater than nine times the chamber
wherein the mold inner surface extends completely around the mold chamber and is absent of separate but joinable edges such that the mold does not form a parting line intermediate of the mold first end and the mold second end; and forming an architectural building column within the mold chamber including the steps of
depositing uncured column material into the mold chamber, and curing the uncured column material within the mold chamber to form the architectural building column including
opposite ends, and
a mold formed column exterior surface extending between the opposite ends and corresponding to the mold inner surface, wherein intermediate of the opposite ends the column exterior surface is absent of any parting line; and
removing the architectural building column from the mold chamber.

13. The method of claim 12, wherein the forming step further includes a step of rotating the mold about the mold axis to cause the uncured column material to spread, under the influence of centrifugal force, about the mold inner surface, and wherein the curing step is carried out during the rotating step.

14. The method of claim 13, wherein the step of providing a flexible unitary mold includes steps of providing a shell including a shell wall defining an accessible shell chamber within the shell, placing a master-column at least partially within the shell chamber to define a mold void between the master-column and the shell wall, wherein the master-column defines an exterior surface that corresponds to the mold inner surface, depositing uncured rubber into the mold void, curing the uncured rubber within the mold void and around the master-column, and removing the master-column from the mold chamber including steps of,
securing the mold,
forcing the master-column through the mold chamber, and maintaining the mold in a generally tubular shape during the step of forcing the master.

15. The method of claim 13, wherein a column length is defined between the opposite ends, and wherein the column length and the mold length are both greater than eight feet.

16. The method of claim 13, wherein the mold inner surface further defines a plurality of substantial intrusions and protrusions, and wherein when the column is formed within the mold chamber the mold formed column exterior surface defines a plurality of substantial intrusions and protrusions that correspond to the protrusions and intrusions of the mold inner surface.

17. The method of claim 16, wherein the intrusions and protrusions of the column exterior surface are constructed and arranged such that the entirety of the column exterior surface is incapable of being formed within and removed from a single rigid mold inner surface that is absent of separate adjoinable edges.

18. The method of claim 13, wherein the uncured column material includes marble dust and fiberglass resin.

19. The method of claim 18, wherein the amount of marble dust in the uncured column material is in the range of 59% to 63%, and wherein the amount of fiberglass resin in the uncured column material is approximately 30%.

20. The method of claim 18, further comprising a step of coating the mold inner surface with a lubricant prior to the step of depositing uncured column material into the mold chamber.

21. The method of claim 18, wherein a column length is defined between the opposite ends of the column, wherein the opposite ends of the column are a column first end, and a column second end opposite from the column first end, and wherein the column exterior surface defines a column first width closer to the column first end than the column second end, a column second width closer to the column second end than the column first end, and a column third width intermediate of the column first width and the column second width, wherein the column third width is less than each of the column first width and the column second width.

22. The method of claim 13, wherein throughout the removing step the inner surface of the mold wall extends completely around the mold chamber.

23. The method of claim 22, wherein the mold inner surface defines an elongated, generally tubular shape, and wherein throughout the removing step the inner surface of the mold wall generally defines an elongated generally tubular shape.

24. The method of claim 23, wherein the step of removing the column from the mold chamber includes steps of securing the mold including steps of providing a seating portion defining an extraction opening, wherein the extraction opening is sized to allow the column to pass therethrough while preventing the mold from passing therethrough, and engaging the mold against the seating portion in a position that allows the column to pass through the extraction opening, and forcing the column through the extraction opening during the step of engaging the mold against the seating portion.

25. The method of claim 23, wherein the removing step includes a step of expanding the mold wall radially relative to the mold axis.

* * * * *

UNITED STATES PATENT AND TRADEMARK OFFICE
CERTIFICATE OF CORRECTION

PATENT NO. : 5,667,744
DATED : September 16, 1997
INVENTOR(S) : Jorge Del Valle; Fred L. Hicks; Steven W. Spires; Daniel J. Brown It is certified that error appears in the above-identified patent and that said Letters Patent is hereby corrected as shown below:

Column 22, lines 23-24, delete "mold length is greater than nine times the chamber".

Signed and Sealed this

Eighteenth Day of April, 2000

Attest:

Q. TODD DICKINSON

*Attesting Officer*      *Director of Patents and Trademarks*